(12) United States Patent
Domes et al.

(10) Patent No.: US 8,936,836 B2
(45) Date of Patent: Jan. 20, 2015

(54) METHOD FOR COATING METAL SURFACES USING AN AQUEOUS COMPOUND HAVING POLYMERS, THE AQUEOUS COMPOUND, AND USE OF THE COATED SUBSTRATES

(75) Inventors: Heribert Domes, Weilmunster (DE); Thomas Griebling, Bad Neuheim (DE)

(73) Assignee: Chemetall GmbH, Frankfurt (DE)

( * ) Notice: Subject to any disclaimer, the term of this patent is extended or adjusted under 35 U.S.C. 154(b) by 939 days.

(21) Appl. No.: 12/529,752

(22) PCT Filed: Mar. 4, 2008

(86) PCT No.: PCT/EP2008/052603
§ 371 (c)(1),
(2), (4) Date: Sep. 3, 2009

(87) PCT Pub. No.: WO2008/110480
PCT Pub. Date: Sep. 18, 2008

(65) Prior Publication Data
US 2010/0062200 A1    Mar. 11, 2010

(30) Foreign Application Priority Data
Mar. 9, 2007   (DE) .................. 10 2007 011 553

(51) Int. Cl.
| | | |
|---|---|---|
| B05D 3/02 | (2006.01) | |
| B32B 15/08 | (2006.01) | |
| B05D 1/02 | (2006.01) | |
| B05D 1/18 | (2006.01) | |
| B05D 1/28 | (2006.01) | |
| B05D 1/30 | (2006.01) | |
| B05D 1/40 | (2006.01) | |
| B05D 1/42 | (2006.01) | |
| B05D 3/06 | (2006.01) | |
| B05D 7/16 | (2006.01) | |
| B05D 7/00 | (2006.01) | |
| B05D 5/00 | (2006.01) | |
| B05D 7/14 | (2006.01) | |
| C08G 18/44 | (2006.01) | |
| C08L 75/04 | (2006.01) | |
| C09D 5/00 | (2006.01) | |
| C09D 5/08 | (2006.01) | |
| C09D 167/00 | (2006.01) | |
| C09D 169/00 | (2006.01) | |
| C09D 175/04 | (2006.01) | |
| B32B 1/08 | (2006.01) | |

(Continued)

(52) U.S. Cl.
CPC . *B32B 15/08* (2013.01); *B05D 1/02* (2013.01); *B05D 1/18* (2013.01); *B05D 1/28* (2013.01); *B05D 1/30* (2013.01); *B05D 1/40* (2013.01); *B05D 1/42* (2013.01); *B05D 3/02* (2013.01); *B05D 3/06* (2013.01); *B05D 3/061* (2013.01); *B05D 3/065* (2013.01); *B05D 3/067* (2013.01); *B05D 7/16* (2013.01); *B05D 7/52* (2013.01); *B05D 2202/00* (2013.01); *B05D 2202/25* (2013.01); *B05D 2202/35* (2013.01); *B05D 2202/45* (2013.01); *B05D 3/0254* (2013.01); *B05D 5/00* (2013.01); *B05D 7/14* (2013.01); *B05D 2202/10* (2013.01); *C08G 18/44* (2013.01); *C08K 3/0016* (2013.01); *C08K 5/0025* (2013.01); *C08K 5/005* (2013.01); *C08K 5/05* (2013.01); *C08K 5/54* (2013.01); *C08K 5/5435* (2013.01); *C08K 7/18* (2013.01); *C08L 75/04* (2013.01); *C08L 83/04* (2013.01); *C08L 91/06* (2013.01); *C09D 5/002* (2013.01); *C09D 5/08* (2013.01); *C09D 167/00* (2013.01); *C09D 169/00* (2013.01); *C09D 175/04* (2013.01); *B32B 1/08* (2013.01); *C09D 7/1233* (2013.01)
USPC .................. 427/388.4; 427/385.5; 427/386; 427/387; 427/388.1

(58) Field of Classification Search
None
See application file for complete search history.

(56) References Cited

U.S. PATENT DOCUMENTS 5,578,669 A    11/1996    Odawa et al.
5,698,628 A *  12/1997    Masuda et al. ................ 524/806
(Continued)

FOREIGN PATENT DOCUMENTS

DE    10149148          5/2002
DE    10 161 383 A1    8/2002
(Continued)

*Primary Examiner* — Erma Cameron
(74) *Attorney, Agent, or Firm* — James R. Crawford; Fulbright & Jaworski LLP

(57) ABSTRACT

A process for coating a metallic surface with an aqueous composition containing a) as the main component, an organic film former consisting of at least one synthetic resin, 70 to 100 wt. % of the content of synthetic resin(s) in the organic film former comprising at least one water-soluble or/and water-dispersible synthetic resin in the form of polymers, copolymers, block copolymers or/and graft copolymers based on synthetic resins selected from the group consisting of polycarbonate, polyurethane, ionomer, poly(meth)acrylate, polyester, polyether or/and polystyrene, the content of polycarbonate and polyurethane being at least 10 wt. % each, at least one long-chain alcohol as film-forming aid for the organic film former, a crosslinker, a lubricant, and a substance based on silane, silanol or/and siloxane or/and at least one inorganic compound in particle form with an average particle diameter measured on a scanning electron microscope in the range from 0.005 to 0.3 µm, and optionally at least one organic corrosion inhibitor, at least one organic solvent or/and at least one additive. The metallic surface is brought into contact with the aqueous composition and a polymeric film is formed on the metallic surface with a film thickness in the range from 0.01 to 10 µm. The aqueous composition and coated products are also contemplated.

77 Claims, No Drawings

(51) Int. Cl.

| | | |
|---|---|---|
| *C09D 7/12* | (2006.01) | |
| *C08K 3/00* | (2006.01) | |
| *C08K 5/00* | (2006.01) | |
| *C08K 5/05* | (2006.01) | |
| *C08K 5/54* | (2006.01) | |
| *C08K 5/5435* | (2006.01) | |
| *C08K 7/18* | (2006.01) | |
| *C08L 83/04* | (2006.01) | |
| *C08L 91/06* | (2006.01) | |

(56) References Cited

U.S. PATENT DOCUMENTS

| | | | |
|---|---|---|---|
| 6,875,479 | B2 | 4/2005 | Jung et al. |
| 2004/0054044 | A1 | 3/2004 | Bittner et al. |
| 2005/0171227 | A1* | 8/2005 | Weine Ramsey ............... 522/1 |
| 2006/0099429 | A1* | 5/2006 | Domes et al. ............... 428/447 |
| 2006/0127681 | A1* | 6/2006 | Domes et al. ............... 428/447 |
| 2006/0233955 | A1 | 10/2006 | Smith et al. |
| 2007/0190259 | A1 | 8/2007 | Bittner et al. |
| 2008/0305341 | A1* | 12/2008 | Plieth et al. ............... 428/419 |
| 2011/0039115 | A1* | 2/2011 | Domes et al. ............... 428/447 |
| 2012/0171402 | A1 | 7/2012 | Smith et al. |

FOREIGN PATENT DOCUMENTS

| | | |
|---|---|---|
| DE | 10 308 237 A1 | 9/2004 |
| EP | 1 433 827 A | 6/2004 |
| EP | 1433827 A1 * | 6/2004 |
| JP | 05-255587 | 10/1993 |
| WO | WO 2006/108657 A1 | 10/2006 |

* cited by examiner

METHOD FOR COATING METAL SURFACES USING AN AQUEOUS COMPOUND HAVING POLYMERS, THE AQUEOUS COMPOUND, AND USE OF THE COATED SUBSTRATES

This application is a §371 of PCT/EP2008/052603 filed Mar. 4, 2008, and claims priority from DE 10 2007 011 533.0 filed Mar. 9, 2007.

The invention concerns a process for coating metallic surfaces with an aqueous composition containing polymers/copolymers and crosslinkers and fine inorganic particles. The invention also concerns a corresponding aqueous composition and the use of the substrates coated by the process according to the invention.

The hitherto most commonly used processes for surface treatment or pretreatment prior to the painting of metals, in particular metal strip, are based on the use of chromium(III) or/and chromium(VI) compounds together with various additives. By reason of the toxicological and ecological risks that such processes entail and, furthermore, by reason of the foreseeable legal restrictions with respect to the use of chromate-containing processes, alternatives to these processes have been sought for some time in all fields of the treatment of metal surfaces.

Resin blends are known in which resins are mixed with inorganic acids in order in this way also to achieve a pickling attack and consequently a better contact of the resin layer directly with the metallic surface. The pickling attack causes metals or/and their ions to be dissolved out of the metallic surface of the substrates to be treated. These compositions have the disadvantage that, by reason of the pickling attack, contamination occurs whilst the treatment liquid (dispersion) is in contact with the substrate. This leads to the concentration of metals in the treatment liquid and, as a consequence, a permanent change in the chemical composition of the treatment liquid, as a result of which the corrosion protection is significantly impaired.

A further disadvantage consists in the fact that, especially in the case of aluminium or/and of alloys containing aluminium, the surfaces become darkly discoloured, in some circumstances turning a dark grey to anthracite colour. The darkly discoloured metal surfaces cannot be employed for decorative applications, since the discoloration itself is undesirable for aesthetic reasons. The darkening is visible with varying intensity, depending on the thickness of the coating.

In terms of the coatings produced therefrom, commercial aqueous compositions based on polyacrylate, polyester, polyethylene, polystyrene or/and polyurethane, which are used for example as/for pretreatments prior to a subsequent painting, for the coating of metallic strips without prior treatment/pretreatment or after a treatment or pretreatment, based for example on an alkali phosphating treatment, zinc-containing or other phosphating treatment, passivation, complex fluoride, phosphonate or/and silane, demonstrate at least one of the following disadvantages:

1. Inadequate paintability of the polymeric surface, e.g. with a powder coating, a solvent-based paint or a water-based paint, such that adhesion problems can occur, especially in a high-humidity climate (testing by means of a cross-hatch adhesion test, for example, and bending on a conical mandrel after storage in a condensation test climate with alternating humidity and air temperature according to DIN EN ISO 6270-2CH).
2. Inadequate long-term resistance to outdoor weathering, such that after an outdoor weathering time of 0.5 to 1.5 years, a marked reduction in the gloss of the polymeric surface, a yellow, brown or/and anthracite discoloration or/and a chalking effect (=breakdown of the polymeric coating on exposure to UV light, wherein the filmed or/and chemically crosslinked polymers/copolymers are destroyed and the coating can be washed off as particles and removed as powder) occur (endurance testing for e.g. 0.5 to 2 years in the open air with direct exposure to sunlight in Frankfurt am Main).
3. Inadequate corrosion resistance, particularly in coating thicknesses in the range from 0.5 to 2 μm (e.g. testing by the salt spray test to DIN EN ISO 7253).
4. Inadequate blocking resistance of metallic strips wound into coils, particularly in the case of coated steel strips, as a consequence of which, owing to the temperatures of the coated strip—often in the range from 50 to 150° C., depending on the coil coating line—the polymeric coating can adhere to the next layer of the strip with which it is in contact, which can readily lead to the destruction of the polymeric coating during unwinding and hence to a deterioration in the corrosion resistance of the coated strip (blocking resistance test in accordance with internal Chemetall guidelines, in which a commercial household aluminium foil is treated with the aqueous composition, the applied wet film is dried in the specified manner, after a rest time under normal conditions the foil is stacked in layers of about 10 and then compressed under a weight of more than 2 kg/cm$^2$; this stack is stored under the weight for 2 h at e.g. 60° C.; then the stack is separated into its individual layers and the coated foil surfaces are evaluated; the foil layers must be able to be separated without difficulty, with only minor markings permissible).
5. Inadequate abrasion resistance of the polymeric coating, in particular immediately after application of the organic coating to a metallic strip in a coil coating line, in particular during the lengthwise splitting of the strip, wherein the strip is conventionally pressed under very high pressure at line speeds often in the region of around 400 m/min, to allow machining and control of the strip at high speed, e.g. during the production of single rolled sheets, particularly during cutting and stacking of the sheets or/and during further processing by forming to produce specially formed machined parts, as in roll forming, deep drawing or/and trimming (abrasion resistance test in accordance with internal Chemetall guidelines, according to which the specimen sheets coated with the aqueous composition and dried are pressed together under the application of a weight of 200 g/cm$^2$ and bent to and fro 50 times; the dust formation by the mechanically loaded coatings is then evaluated.

DE-A1-101 49 148 describes aqueous coating compositions based on organic film former, fine inorganic particles and lubricant or/and organic corrosion inhibitor, which despite the absence of chromium compounds produced excellent corrosion resistance, adhesive strength and formability results on inter alia Galvalume® steel sheets, but often also exhibited at least one disadvantage. The compositions, their constituents and the properties of the raw materials and coatings of this publication are expressly incorporated into this application.

JP-A-05-255587 concerns a process for coating metal plates with a dispersion consisting of polyurethane resin, fine or/and coarser SiO$_2$ particles and polyolefin wax having a melting point of at least 90° C. or/and PTFE. The polyurethane resin has a certain elasticity and is supposed to give the coating good deep-drawing properties.

One object of the invention is therefore to overcome at least one of the aforementioned disadvantages of the prior art. A further object is to propose a process for coating metallic surfaces that is also suitable for high coating speeds, e.g. in the range from 60 to 160 m/min, such as are often used for strips. A further object is to propose a coating process which can be used largely or entirely without chromium(VI) compounds, which as far as possible is also free from inorganic and organic acids, which can be used on an industrial scale and wherein the polymeric coatings produced according to the invention, which are largely or entirely free from chromium(VI) compounds, are highly versatile.

It has now been found that with a dry film thickness in the range from 0.3 to 5 μm, an organic polymeric film produced by adding a polycarbonate-containing organic film former and an inorganic crosslinker can exhibit very high flexibility such as e.g. very high ultimate elongation, very high hardness such as e.g. very high König pendulum hardness determined in accordance with DIN EN ISO 1522, good to very good paintability, good long-term resistance to outdoor weathering, excellent corrosion protection, high to very high blocking resistance, high or very high chemical resistance or/and high to very high abrasion resistance.

The object is achieved by a process for coating a metallic surface with an aqueous composition for pretreating a metallic surface prior to a further coating or for treating a metallic surface, wherein the body to be coated, such as e.g. a strip or sheet, is optionally formed after coating, which is characterised in that in addition to water the composition contains a) as the main component, an organic film former consisting of at least one synthetic resin, 70 to 100 wt. % of the content of synthetic resin(s) in the organic film former comprising at least one water-soluble or/and water-dispersible synthetic resin in the form of polymers, copolymers, block copolymers or/and graft copolymers based on synthetic resins selected from the group consisting of polycarbonate, polyurethane, ionomer, poly(meth)acrylate, polyester, polyether or/and polystyrene, the content of polycarbonate and polyurethane being at least 10 wt. % each, b) at least one long-chain alcohol as film-forming aid for the organic film former, c) at least one crosslinker, d) at least one lubricant, and e) A) at least one substance based on silane, silanol or/and siloxane or/and B) at least one inorganic compound in particle form with an average particle diameter measured on a scanning electron microscope in the range from 0.005 to 0.3 μm, and f) optionally at least one organic corrosion inhibitor, at least one organic solvent or/and at least one additive, wherein the metallic surface is brought into contact with the aqueous composition and a substantially organic film is formed on the metallic surface, which is then dried and optionally also cured, wherein the dried and optionally also cured film has a film thickness in the range from 0.01 to 10 μm, determined by detaching a defined area of the cured film and weighing it.

Within the meaning of this patent application, the organic film former denotes the total amount of synthetic resins, which can optionally—especially if at least one commercially available paint resin is added—also contain at least one paint additive, which is often undetectable or scarcely detectable, particularly when included in a small amount. Stated contents are conventionally based on solids including active ingredients.

The organic film former, i.e. the at least one water-soluble or/and water-dispersible synthetic resin as an organic film former, is preferably included in the aqueous composition—in particular in the bath and as a bath (=bath composition), but also as a concentrate or/and make-up composition to prepare or to top up the bath composition—in a content in the range from 2 to 600 g/l, particularly preferably in the range from 10 to 575 g/l, from 30 to 550 g/l, from 50 to 525 g/l, in the range from 70 to 500 g/l, from 90 to 475 g/l, from 110 to 450 g/l, from 130 to 425 g/l, from 150 to 400 g/l, from 170 to 375 g/l or from 190 to 350 g/l. The content of organic film former, however, like the contents of the other components, is substantially dependent inter alia on the type of coating line, its application or/and line speed and in particular on the desired dry film thickness of the coating to be produced. The highest contents of organic film former can occur in particular in radically curing systems with little or no content of volatile components such as organic solvents or/and residual monomers. Particularly preferred for the process according to the invention are coatings that a) form a film and are at least slightly crosslinked by physically means, predominantly or solely during the course of drying or/and heating, or b) form a film and are also crosslinked by chemical or/and by chemical/thermal means. It is particularly advantageous in this respect if the coating according to the invention forms a film by physical means, predominantly or solely during the course of drying or/and heating.

The at least one water-soluble or/and water-dispersible synthetic resin as organic film former makes up the main component of the solids and active ingredients in the aqueous composition, i.e. at least 40 wt. % or at least 50 wt. % of the solids including active ingredients in the composition according to the invention. Each polymeric additive in the aqueous composition is preferably substantially at least one organic polymer, organic copolymer, organic block copolymer or/and organic graft copolymer (=polymer/copolymer/block copolymer/graft copolymer). The content of water-soluble or/and water-dispersible synthetic resins as organic film former is preferably in the range from 40 to 99.5 wt. % or 50 to 99 wt. % of the solids including active ingredients in the aqueous composition according to the invention, particularly preferably in the range from 60 to 98 wt. % or 70 to 96 wt. %, in some embodiments in the range from 75 to 92 wt. % or 80 to 86 wt. %.

It has been found that organic film formers having a substantial content of at least one synthetic resin based on polycarbonate and polyurethane, particularly where a proportion of aliphatic polyurethane is used, are particularly suitable for achieving the high-quality properties of the coating according to the invention. In cases where requirements are less stringent, the use of aromatic polyurethane is adequate, and a larger proportion of other polymeric constituents can be permitted. Depending on the desired range of properties and the corresponding economic viability, combinations of synthetic resins or/and synthetic resin components with polyester, polyacrylate, etc., are possible, with the corresponding adjustment of the flexibility and other properties of the dry films. The polycarbonate component of the organic film former promotes in particular chemical resistance and hardness, whilst the polyurethane component promotes in particular flexibility, adhesion and formability. The ratio by weight of polycarbonate to polyurethane in the organic film former is preferably 2:1 to 1:2, particularly preferably 3:2 to 2:3, 4:3 to 3:4 or is close to or exactly 1:1.

The organic film former in the aqueous composition preferably contains at least one water-soluble or/and at least one water-dispersible synthetic resin based on polycarbonate or/and polyurethane, wherein at least 50 wt. % of the synthetic resins are those based on polycarbonate or/and polyurethane, such that the proportion of polycarbonate and polyurethane makes up at least 50% of the organic film former. These two proportions are particularly preferably at least 60 or at least 70 wt. %, at least 75 or at least 80 wt. %, at least 85 or at least 90 wt. %, at least 95, at least 98 or at least 99 wt. % or close to or exactly 100 wt. %. These components can be present as polycarbonate, polyurethane, polycarbonate-polyurethane or/and polyurethane-polycarbonate- ... with at least one further constituent such as for example ionomer, poly(meth)acrylate, polyester, polyether or/and polystyrene. Correspondingly, the dry film produced therefrom will consist substantially of such contents or/and such minimum contents of synthetic resins, as specified in this paragraph, which have optionally been further copolymerised or/and crosslinked. In many cases they will then be present as polycarbonate-polyurethane or/and polyurethane-polycarbonate- ... with at least one further constituent.

In some of very many possible embodiments, the composition according to the invention contains only or substantially only polymer/copolymer/block copolymer/graft copolymer based on polyurethane-polycarbonate or/and polyurethane-polycarbonate- ... , such as with for example a content of ionomer, poly(meth)acrylate, polyester, polyether or/and polystyrene. Correspondingly, the dry film produced therefrom will consist substantially of polymer/copolymer/block copolymer/graft copolymer based on polyurethane-polycarbonate or/and polyurethane-polycarbonate- ... , such as with for example a content of ionomer, poly(meth)acrylate, polyester, polyether or/and polystyrene. In most embodiments, however, at least one further, different synthetic resin in addition to polyurethane and polycarbonate is added to or/and included in the aqueous composition. The content of synthetic resin(s) based on polyurethane-polycarbonate or/and polyurethane-polycarbonate- ... with at least one further constituent, such as e.g. ionomer, poly(meth)acrylate, polyester, polyether or/and polystyrene, is preferably in the range from 40 to 99.5 wt. % or 50 to 99 wt. % of the solids including active ingredients in the composition according to the invention, particularly preferably in the range from 60 to 98 wt. % or 70 to 96 wt. %, in some embodiments in the range from 75 to 92 wt. % or 80 to 86 wt. %.

In some of very many possible embodiments, the composition according to the invention contains only or substantially only polymer/copolymer/block copolymer/graft copolymer based on polyurethane-polycarbonate or/and polyurethane-polycarbonate- ... , such as with for example a content of ionomer, poly(meth)acrylate, polyester, polyether or/and polystyrene. Correspondingly, the dry film produced therefrom will consist substantially of polymer/copolymer/block copolymer/graft copolymer based on polyurethane-polycarbonate or/and polyurethane-polycarbonate- ... , such as with for example a content of ionomer, poly(meth)acrylate, polyester, polyether or/and polystyrene. In most embodiments, however, at least one further, different synthetic resin is added to or/and included in the aqueous composition. The content of synthetic resin(s) based on polyurethane-polycarbonate or/and polyurethane-polycarbonate- ... with at least one further constituent, such as e.g. ionomer, poly(meth)acrylate, polyester, polyether or/and polystyrene, is preferably in the range from 40 to 99.5 wt. % or 50 to 99 wt. % of the solids including active ingredients in the composition according to the invention, particularly preferably in the range from 60 to 98 wt. % or 70 to 96 wt. %, in some embodiments in the range from 75 to 92 wt. % or 80 to 86 wt. %.

In some embodiments at least one synthetic resin is a copolymer/block copolymer/graft copolymer having 3, 4, 5 or even more organic constituents, e.g. a synthetic resin based on polyurethane-polycarbonate-polyester, polyurethane-polycarbonate-poly(meth)acrylate, polyurethane-polycarbonate-poly(meth)acrylate, polyurethane-polycarbonate-polyester-poly(meth)acrylate or/and polyurethane-polycarbonate-polyester-polyether, which can optionally also include a content of at least one further component, such as e.g. with a content of ionomer, poly(meth)acrylate, polyester, polyether or/and polystyrene, wherein the order of the components stated here is not intended to convey anything about their relative contents.

The organic film former preferably includes a content of synthetic resin in the form of at least one polymer, copolymer, block copolymer or/and graft copolymer based on polycarbonate in the range from 10 to 70 wt. % of the total content of organic film former, particularly preferably in the range from 18 to 62, from 26 to 54 or from 34 to 46 wt. %.

The organic film former preferably includes a content of synthetic resin in the form of at least one polymer, copolymer, block copolymer or/and graft copolymer based on polyurethane in the range from 10 to 70 wt. % of the total content of organic film former, particularly preferably in the range from 18 to 62, from 26 to 54 or from 34 to 46 wt. %.

The organic film former preferably includes a content of synthetic resin in the form of at least one polymer, copolymer, block copolymer or/and graft copolymer based on at least one aliphatic polyurethane in the range from 5 to 70 wt. % of the total content of organic film former, particularly preferably in the range from 10 to 66, 18 to 62, from 26 to 54, from 30 to 50 or from 34 to 46 wt. %. The dominant proportion or even at least 70 or at least 85 wt. % of the added proportion of polyurethane is preferably at least one aliphatic polyurethane.

In some embodiments the organic film former preferably includes a content of synthetic resin in the form of at least one polymer, copolymer, block copolymer or/and graft copolymer based on polyester in the range from 1 to 40 wt. % of the total content of organic film former, particularly preferably in the range from 8 to 34, from 12 to 28 or from 16 to 22 wt. %.

In some embodiments the organic film former preferably includes a content of synthetic resin in the form of at least one polymer, copolymer, block copolymer or/and graft copolymer based on poly(meth)acrylate, polyester, polystyrene or/and polyvinyl, in each case in the range from 1 to 40 wt. % of the total content of organic film former, particularly preferably in each case in the range from 8 to 34, from 12 to 28 or from 16 to 22 wt. %. In many embodiments the content of such synthetic resins is 0 to 40 wt. % of the organic film former, based on solids including active ingredients, preferably in the range from 1 to 30, 3 to 25, 5 to 20 or 8 to 15 wt. %. With regard to poly(meth)acrylate, it is particularly preferable for polyacrylic acid or/and polymethacrylic acid in polymer form to be added to the aqueous composition. Copolymer based on styrene acrylate or/and styrene acrylate- ... is also particularly preferred. The organic film former preferably consists substantially or entirely of synthetic resins based on polyurethane-polycarbonate or/and polyurethane-polycarbonate- ... with a content of ionomer, poly(meth)acrylate, polyester, polyethylene, polyphenol, polystyrene or/and polyvinyl, in particular with a content of polycarbonate and polyurethane in the organic film former of at least 10 wt. % each and with a content of ionomer, poly(meth)acrylate, polyester, polyethylene, polyphenol, polystyrene or/and polyvinyl in the range from 0 to 40 wt. % of the organic film former, based in each case on solids including active ingredients, preferably in the range from 1 to 30, 3 to 25, 5 to 20 or 8 to 15 wt. %, wherein preferably 60 to 100 wt. % of the organic film former, in particular 70 to 98 or 80 to 95 wt. %, are synthetic resins based on copolymers having 2, 3, 4 or/and 5 different constituents (each constituent within the meaning of this application represents a proportion of the organic film former of at least 1 wt. %, e.g. acrylate, methacrylate, polyester, styrene, etc., are individual constituents).

At least 90 wt. % of the synthetic resins—based on solids including active ingredients—are preferably those based on polymer/copolymer/block copolymer/graft copolymer. This means that in some cases optionally 0.01 to 10 wt. %, 0.05 to 5 wt. % or 0.1 to 2 wt. % of the synthetic resins can be in the form of organic monomers or/and organic oligomers, in particular predominantly or only in the form of organic oligomers, which are then a constituent of the aqueous composition at the start of crosslinking. Organic monomers or/and organic oligomers are preferably not added deliberately but are included in at least one synthetic resin, optionally in a commercial synthetic resin product, as a result of incomplete chemical reactions.

At least 60 wt. %, at least 75 wt. %, at least 90 wt. % or 95 to 99.5 wt. % of the synthetic resins that are added to the organic film former or to the aqueous composition are preferably in the form of copolymers—based on solids including active ingredients.

At least 20 wt. % of the synthetic resins—based on solids including active ingredients—are preferably in the form of polymer/copolymer/block copolymer/graft copolymer based on polycarbonate-polyurethane or/and corresponding polymers/copolymers/block copolymers/graft copolymers, from which optionally at least one copolymer/block copolymer/graft copolymer based on polycarbonate-polyurethane or/and polycarbonate-polyurethane- . . . with at least one further constituent such as e.g. ionomer, poly(meth)acrylate, polyester, polyether or/and polystyrene can be formed or was formed during coating, heating or/and drying; they are particularly preferably in the range from 20 to 100 wt. %, 30 to 95 wt. %, 40 to 90 wt. %, 50 to 85 wt. %, 60 to 80 wt. % or 65 to 75 wt. % of the synthetic resins. In these and further embodiments the content of synthetic resins based on polyurethane-polycarbonate or/and polyurethane-polycarbonate- . . . with at least one further constituent, such as e.g. ionomer, poly(meth)acrylate, polyester, polyether or/and polystyrene, is preferably in the range from 20 to 99 wt. % of the solids including active ingredients in the aqueous composition according to the invention, particularly preferably in the range from 30 to 98 wt. %, 40 to 96 wt. %, 50 to 92 wt. %, 60 to 88 wt. % or 70 to 84 wt. %. Polycarbonate-polyurethane-polyester or/and polycarbonate-polyurethane-polyester- . . . are particularly preferred, regardless of which components, such as e.g. carbonate, ester or urethane, dominate therein.

In some embodiments it is preferable for the composition according to the invention to have a content of at least one synthetic resin in the form of polymer/copolymer/block copolymer/graft copolymer based on polyester-polyurethane or/and polyester-polyurethane- . . . with at least one further constituent such as e.g. ionomer, poly(meth)acrylate, polycarbonate, polyether or/and polystyrene or/and corresponding polymers, from which a copolymer based on polyester-polyurethane or/and polyester-polyurethane- . . . with at least one further constituent such as e.g. ionomer, poly(meth)acrylate, polycarbonate, polyether or/and polystyrene can be formed during coating, heating or/and drying; this content is particularly preferably in the range from 10 to 100 wt. %, 20 to 95 wt. %, 30 to 90 wt. %, 40 to 85 wt. %, 50 to 80 wt. % or 60 to 70 wt. %—based on solids including active ingredients. The content of such synthetic resins is preferably in the range from 5 to 99 wt. % of the solids including active ingredients in the composition according to the invention, particularly preferably in the range from 10 to 96 wt. %, 20 to 92 wt. %, 30 to 88 wt. %, 40 to 84 wt. %, 50 to 80 wt. % or 60 to 76 wt. %.

In some embodiments it is preferable for the composition according to the invention to have a content of at least one synthetic resin in the form of polymer/copolymer/block copolymer/graft copolymer based on polycarbonate-polyurethane-poly(meth)acrylate, polyester-polyurethane-poly(meth)acrylate, polyester-polyurethane-polycarbonate, polyester-polycarbonate-polyurethane-poly(meth)acrylate or/and corresponding polymers, from which at least one of the corresponding copolymers/block copolymers/graft copolymers can be formed during coating, heating or/and drying; this content is particularly preferably in the range from 10 to 100 wt. %, 20 to 95 wt. %, 30 to 90 wt. %, 40 to 85 wt. %, 50 to 80 wt. % or 60 to 70 wt. % of the synthetic resins—based on solids including active ingredients. The content of such synthetic resins is preferably in the range from 5 to 99 wt. % of the solids including active ingredients in the composition according to the invention, particularly preferably in the range from 10 to 94 wt. %, 20 to 88 wt. %, 30 to 82 wt. %, 40 to 76 wt. % or 50 to 70 wt. %.

In some embodiments it is preferable for the composition according to the invention to have a content of at least one synthetic resin in the form of polymer/copolymer/block copolymer/graft copolymer containing a proportion of polycarbonate, polyester or/and aliphatic polyurethane. This proportion is particularly preferably 10 to 100 wt. %, 20 to 95 wt. %, 30 to 90 wt. %, 40 to 85 wt. %, 50 to 80 wt. % or 60 to 70 wt. % of the synthetic resins—based on solids including active ingredients. The content of such synthetic resins is preferably in the range from 10 to 99 wt. % of the solids including active ingredients in the composition according to the invention, particularly preferably in the range from 20 to 98 wt. %, 30 to 96 wt. %, 40 to 92 wt. %, 50 to 88 wt. %, 60 to 84 wt. % or 70 to 80 wt. %.

In some embodiments it is preferable for the composition according to the invention to have a content of at least one synthetic resin in the form of polymer/copolymer/block copolymer/graft copolymer that is anionically or/and non-conically stabilised. This proportion is particularly preferably 10 to 100 wt. %, 20 to 95 wt. %, 30 to 90 wt. %, 40 to 85 wt. %, 50 to 80 wt. % or 60 to 70 wt. % of the synthetic resins—based on solids including active ingredients. The content of such synthetic resins is preferably in the range from 10 to 99 wt. % of the solids including active ingredients in the composition according to the invention, particularly preferably in the range from 20 to 98 wt. %, 30 to 96 wt. %, 40 to 92 wt. %, 50 to 88 wt. %, 60 to 84 wt. % or 70 to 80 wt. %.

Furthermore, in some embodiments it can be preferable for the composition according to the invention to have a content of at least one synthetic resin in the form of polymer/copolymer/block copolymer/graft copolymer based on ionomer, poly(meth)acrylate or/and polystyrene, such as e.g. polyethylene acrylate, without however taking into account here an optional content of poly(meth)acrylate with polycarbonate, with polyester or/and with polyurethane. The content of such synthetic resin is particularly preferably 3 to 30 wt. %, 5 to 25 wt. %, 8 to 22 wt. %, 10 to 20 wt. % or 12 to 18 wt. % of the synthetic resins—based on solids including active ingredients. The content of such synthetic resins is preferably in the range from 1 to 30 wt. % of the solids including active ingredients in the composition according to the invention, particularly preferably in the range from 2 to 25 wt. %, 3 to 20 wt. %, 4 to 20 wt. %, 5 to 18 wt. %, 8 to 16 wt. % or 10 to 14 wt. %.

Furthermore, in some embodiments a different polymer/copolymer/block copolymer/graft copolymer not cited above can also be included with a content preferably in the range from 0.1 to 20 wt. %, 1 to 16 wt. %, 3 to 12 wt. % or 5 to 9 wt. % of the synthetic resins, based on solids including active ingredients. The content of such synthetic resins is preferably in the range from 0.5 to 20 wt. % of the solids including active ingredients in the composition according to the invention, particularly preferably in the range from 1 to 15, 2 to 13, 3 to 11, 4 to 9 or 5 to 8 wt. %.

Furthermore, in some embodiments the composition according to the invention can also contain at least one poly (meth)acrylate or/and at least one copolymer/block copolymer/graft copolymer containing poly(meth)acrylate, particularly preferably with a content of 10 to 100 wt. %, 20 to 95 wt. %, 30 to 90 wt. %, 40 to 85 wt. %, 50 to 80 wt. % or 60 to 70 wt. % of the synthetic resins, based on solids including active ingredients. The content of such synthetic resins is preferably in the range from 5 to 99 wt. % of the solids including active ingredients in the composition according to the invention, particularly preferably in the range from 10 to 95 wt. %, 20 to 90 wt. %, 30 to 80 wt. %, 40 to 70 wt. % or 50 to 60 wt. %.

Most particularly preferred is a content of at least one synthetic resin based on poly(meth)acrylate or/and ethylene acrylic acid (ionomer) with a melting point in the range from 60 to 95° C. or/and at least one synthetic resin with a melting point in the range from 20 to 160° C., in particular in the range from 60 to 120° C.

The ionomers are conventionally organic polymeric substances or mixtures therewith having ionic sites that were reacted at least partially with counterions or/and partially during crosslinking e.g. in the dry film and optionally perhaps even later in the dry film. Suitable ions include in particular ions of ammonium, sodium, potassium, calcium, magnesium, aluminium, iron, manganese, titanium, zinc or/and zirconium. As raw materials the ionomers can exhibit crosslinked organic non-ionic units and in many cases also a mostly small content of ion-containing units, which units repeat. These ionic groups often make up less than 30 wt. % or even less than 15 wt. % of the ionomers. The ionomeric polymeric substances differ markedly from waxes.

The ionomers can be selected in particular from polymeric materials and mixtures therewith, which contain predominantly (meth)acrylic acid copolymer, maleic anhydride copolymer or/and naphthalenic acid copolymer with a component based on ethylene or/and propylene or/and the corresponding polymers, block copolymers or/and graft copolymers. These can also include a content of polymeric substance based on styrene, butadiene, urethane, fumaric acid or/and sulfonic acid. In some cases they can also contain a small proportion of groups of acrylate, butyl, isobutyl, ethyl, methyl, propyl or/and vinyl, a small content of monomers or/and oligomers, a small content of at least one compound based on amine or/and a small content of ester(s) or/and salt(s) of at least one of the copolymeric organic compounds. They can be in water, preferably with pH values in the range from 6.5 to 10.5.

The organic film former is preferably a polymer/copolymer/block copolymer/graft copolymer including a content of in particular at least one synthetic resin based on poly(meth) acrylate such as e.g. butyl acrylate, poly(meth)acrylate, polyester, polyethylene or/and polystyrene, from which during or/and after the removal of water and optionally other volatile constituents an organic film can be formed. The organic film that is formed in this way can also contain in particular, in addition to at least one synthetic resin based on polycarbonate, at least one synthetic resin based on poly(meth)acrylate, polyester, polyethylene, polystyrene or/and polyurethane. The organic film former preferably includes a content of synthetic resin in the form of at least one polymer, copolymer, block copolymer or/and graft copolymer based on (meth) acrylate, ethylene (meth)acrylate or/and styrene (meth)acrylate.

The bulk of the synthetic resins or even all the synthetic resins included in the organic film former preferably exhibit carboxyl groups. The carboxyl groups can optionally be neutralised inter alia with ammonia, amines—in particular alkanolamines—or/and alkali metal compounds and reacted to form an aqueous solution with a readily water-dilutable synthetic resin which prior to this reaction was optionally not water-soluble under normal conditions. The neutralisation of the COOH groups is an anionic stabilisation. It can also be necessary in addition for at least one emulsifier or/and at least one protective colloid (as an additive within the meaning of this application) to be added to stabilise the dispersion of the synthetic resin, the organic film former or/and the aqueous composition.

The acid groups of the synthetic resin can be or/and can have been neutralised with ammonia, with amines—in particular alkanolamines—such as e.g. morpholine, dimethylethanolamine, diethylethanolamine or triethanolamine—or/and with alkali metal compounds such as e.g. sodium hydroxide.

Depending on the desired film properties of the coating according to the invention, combinations of for example polycarbonate, polyester, polyether, poly(meth)acrylate or/and polyurethane can be selected in the organic film former, said combinations making it possible for the dry films to exhibit an appropriate substrate adhesion, flexibility and formability.

In the process according to the invention the organic film former can be in the form of a solution, dispersion, emulsion, microemulsion or/and suspension. The term dispersion here also includes the subsidiary terms emulsion, microemulsion and suspension. The organic film former is preferably a synthetic resin blend or/and preferably contains at least one mixed polymer (=copolymer/block copolymer/graft copolymer) that includes a content of synthetic resin based on (meth) acrylate, epoxide, urea-formaldehyde, melamine-formaldehyde, (meth)acrylate, phenol, polyacrylic acid, polyether, polyethylene, polyethylenimine, polystyrene, polyvinyl or/and polyvinyl phenol. It can be a cationically, anionically or/and sterically stabilised synthetic resin or/and a solution/dispersion thereof.

The organic film former is preferably a synthetic resin blend or/and a mixed polymer (=polymer based predominantly, largely or entirely on copolymer, block copolymer or/and graft copolymer) including a content of synthetic resin based on acrylate, epoxide, ethylene, urea-formaldehyde, phenol, polyester, polyurethane or/and styrene, from which during or/and after release of water and other volatile constituents an organic film is formed. The organic film former can contain a synthetic resin based on epoxide, phenol, polyacrylic acid, polyethylenimine, polyurethane, polyvinyl phenol or/and derivatives thereof, in particular at least partly in the form of copolymers.

The organic film former most particular preferably contains at least one synthetic resin based on acrylate or based on ethylene acrylic acid with a melting point in the range from 60 to 95° C. or/and at least one synthetic resin with a melting point in the range from 20 to 160° C., in particular in the range from 60 to 120° C.

The acid value of the synthetic resin/synthetic resin blend can preferably be in the range from 8 to 140, particularly preferably in the range from 10 to 100, most particularly preferably in the range from 12 to 80. In a high acid value range it is not generally necessary to stabilise a film former cationically, anionically or/and sterically. With a low acid value, however, such a stabilisation is usually necessary. In such a case it is advantageous to use pre-stabilised synthetic resins or/and blends.

The molecular weight of the synthetic resins can be in the range of at least 1000 u, preferably in the range from 5000 to 250,000 u, particularly preferably in the range from 20,000 to 200,000 u.

In the process according to the invention the pH of the aqueous composition of the organic film former, without addition of further compounds, can preferably be in the range from 6.5 to 11, particularly preferably in the range from 7 to 10.5, from 7.5 to 10 or from 8 to 9.5. It should be noted in this regard that in many cases the synthetic resins have already been neutralised by the synthetic resin manufacturer, e.g. during polymerisation. The pH of the organic film former in an aqueous preparation without addition of further compounds is preferably in the range from 1 to 12. If during preparation of the aqueous composition the pH of the organic film former or/and of the aqueous composition moves to values outside the range from 6.5 to 11, it is recommended that it be returned to the pH range from 6.5 to 11 or even to a still narrower working range within this range by means of a suitable addition, but preferably only by addition of at least one basic substance, since an undesirable salt formation can occur with the addition of an acid or/and acidic substance. If the pH has fallen as a result of the storage of the synthetic resins or/and blends, it can be helpful to bring the pH, in particular of an otherwise ready-to-use aqueous composition, back into a more alkaline range, by the addition of sodium hydroxide solution, for example.

The organic film former preferably contains only synthetic resin(s) having carboxyl groups. The carboxyl groups can be neutralised inter alia by means of ammonia, amines—in particular alkanolamines—or/and alkali metal compounds and reacted to form an aqueous solution with a readily water-dilatable synthetic resin which previously was not water-soluble under normal conditions. For the purposes of crosslinking the carboxyl-group-containing synthetic resins, at least one crosslinker for chemical crosslinking is advantageously added.

The organic film former preferably contains only synthetic resin(s) which are free or substantially free from halogens such as e.g. chlorine or/and fluorine. The organic film former contains no PTFE. That is because the aim is to avoid inadequate paintability (overcoatability). If a content of chlorine or/and fluorine is to be introduced into the aqueous composition, it is preferably only a comparatively small content or/and it is preferably achieved only or substantially only by the addition of at least one corresponding silane or/and at least one corresponding silanol/siloxane/polysiloxane.

By reason of their physical properties, many synthetic resins can be classed as elastomers or/and thermoplastics. If the applied wet film is not substantially converted by structural change into a thermoset material during what for technical reasons is often a minimal drying stage—often in the range from 40 to 120° C. PMT and often for a time in the range from 1 to 10 seconds—and if for that reason the dried protective film substantially retains the properties of the elastomers or/and the thermoplastics, this protective film may in some circumstances be unsuitable for the intended application. It has been established that particularly high-quality properties of the dried coatings are more likely to be achieved with polymeric coatings in which, during and after drying, during which process crosslinking takes place with the crosslinker, and optionally also after curing, the synthetic resins behave predominantly or substantially as thermoset materials.

In aqueous compositions, prior to their application and prior to thermal or/and chemical/thermal drying, many synthetic resin systems generally take the form of elastomers or/and thermoplastics. During thermal drying, which generally requires a minimum temperature of 100° C. PMT and a relatively long residence time, crosslinking with suitable crosslinkers causes the elastomers or thermoplastics for example to be converted into thermoset materials on completion of crosslinking, due to structural change of the molecules. The longer the residence time for complete crosslinking, the lower the temperature can be.

Owing to the fact that adequate drying temperatures or/and dryer residence times, such as are favourable to or necessary for structure-changing chemical reactions with the corresponding crosslinkers in order to convert formulation components with thermoplastic or/and elastomeric properties into protective films with thermoset properties, are often not available, it has proved to be particularly advantageous to use preparations which in the liquid form before application and drying already contain components having thermoset or predominantly thermoset properties. In this way, even at comparatively low drying temperatures—relatively independently of the drying conditions that can be achieved—polymeric coatings are produced which as a rule, in addition to excellent corrosion resistance (tested in various climates), exhibit good overcoatability with a large number of diverse paint systems, excellent blocking resistance at temperatures of the coated and adjoining substrate surfaces, as in a coil, of over 50° C., good resistance to acids and lyes, good yellowing resistance at elevated temperatures, excellent resistance to mechanical loading during further processing of the coated substrate surfaces, such as e.g. forming, roll forming, deep drawing and trimming, and excellent resistance to outdoor weathering in various climates.

The organic film former preferably contains at least one ionically stabilised or/and non-ionically stabilised thermoset material, which can be present in particular as a polymer or/and as a copolymer, such as e.g. pure polyurethane, polyester-polyurethane, polycarbonate-polyurethane or/and polycarbonate-polyurethane- . . . . These thermoset materials can in particular make up 10 to 100 wt. % of the organic film former, preferably 50 to 98 wt. % or 70 to 90 wt. %. The organic film former can moreover also contain one or more ionically or/and non-ionically stabilised thermoplastics, in particular in a proportion of thermoplastics in the organic film former in the range from 1 to 50 wt. %, preferably in a proportion of thermoplastics in the organic film former in the range from 5 to 35 wt. %. The organic film former can in addition also contain one or more mixed polymers, in particular copolymers, comprising at least one thermoplastic and at least one thermoset material, in particular in a proportion in the range from 1 to 50 wt. %, preferably in a proportion in the range from 5 to 35 wt. %.

The at least one film-forming aid, which is added or/and has been added in the form of at least one long-chain alcohol, serves to improve film forming, particularly during drying. A largely or wholly homogeneous organic film is formed by film forming from the organic film former and at least one long-chain alcohol, in particular during or/and after the removal of water and other volatile constituents. With a view to improving film formation by the polymeric particles of the aqueous composition during drying, at least one long-chain alcohol, preferably a butanediol, based in particular on triethylene glycol or tripropylene glycol, can be added in particular as a temporary plasticiser of the polymeric particles.

The content of at least one film-forming aid in the aqueous composition—in particular in the bath—can be preferably 0.01 to 50 g/l based on solids including active ingredients, particularly preferably 0.08 to 35 g/l, most particularly preferably 0.2 to 25 g/l, 0.3 to 20 g/l or 0.5 to 16 g/l, in particular 1 to 12 g/l, 2 to 10 g/l, 3 to 8 g/l or 4 to 6 g/l. The ratio by weight of the contents of organic film former to contents of film-forming aids in the aqueous composition—in particular in the bath—can vary widely; in particular it can be ≤(100: 0.1). This ratio is preferably in the range from 100:10 to 100:0.2, from 100:5 to 100:0.4 or from 100:2.5 to 100:0.6, particularly preferably in the range from 100:2 to 100:0.75, from 100:1.6 to 100:0.9 or from 100:1.4 to 100:1.

The term film formation is understood to be the formation of a film from a material having a high organic content such as a polymer dispersion, in which process primarily polymer particles turn into a uniform film, preferably at room temperature or slightly elevated temperature. Melting of the comparatively large polymer particles is often mentioned in this connection. In this case film formation takes place from an aqueous medium during drying and optionally with plasticisation of the polymer particles by the remaining film-forming aid.

Film forming can be brought about or/and improved by the use of soft synthetic resin (König pendulum hardness at room temperature in accordance with DIN EN ISO 1522 measured in less than 30 s) or/and by addition of substances which act as temporary plasticisers (=film-forming aids). Film-forming aids act as specific solvents, which soften the surface of the polymer particles and thus make possible their geometric change through melting of the organic particles with one another, but which in particular are not evanescent and which in particular largely evaporate off after evaporation of the water and preferably do not remain in the film permanently. The film that is produced is often pore-free or substantially pore-free and can include undissolved or/and indissoluble particles such as e.g. inorganic particles. It is advantageous in this regard if these plasticisers remain in the aqueous composition long enough to act for some time on the polymer particles and then evaporate and escape from the film. A suitable film-forming process produces a transparent film, not a milky-white or even powdery film, which is a sign of a disturbed film-forming process. For as perfect a film formation as possible, the temperature of the wet film applied to the surface must be above the minimum film-forming temperature (MFFT). Only then are the polymer particles soft enough to coalesce. It is particularly advantageous in this respect if the film-forming aids as temporary plasticisers do not alter or scarcely alter the pH of the aqueous composition.

Selecting suitable film-forming aids is not easy, a mixture of at least two film-forming aids often being required. The film-forming aids preferably have a boiling point at 760 mm Hg in the range from 140 to 400° C., in particular in the range from 150 to 340° C., from 160 to 310° C. or from 170 to 280° C., or/and a relative evaporation rate with ether=1 in the range from 100 to 5000, in particular in the range from 120 to 4000, from 135 to 2800 or from 150 to 1600. So-called long-chain alcohols are particularly advantageous as film-forming aids, preferably those having 4 to 16 C atoms, particularly preferably 6 to 12 C atoms. These are preferably examples such as at least one butanediol, butyl glycol, butyl diglycol, ethylene glycol ether such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether, diethylene glycol hexyl ether or/and at least one polypropylene glycol ether such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether or/and propylene glycol phenyl ether.

In contrast to film formation, which can take place at comparatively low temperatures, such as e.g. temperatures in the range from about 5° C., for chemically or chemically/thermally crosslinking organic coatings temperatures of at least 50° C. are necessary for crosslinking. Film-forming aids are preferably selected and added in a quantity such that the composition forms a film at temperatures preferably greater than 120° C., particularly preferably greater than 100° C., greater than 80° C. or greater than 60° C., in particular greater than 40° C., greater than 20° C., greater than 10° C. or greater than 5° C. Accordingly, it is preferable for the minimum film-forming temperature of the synthetic resins including film-forming aids to be greater than 120° C., particularly preferably greater than 100° C., greater than 80° C. or greater than 60° C., in particular greater than 40° C., greater than 20° C., greater than 10° C. or greater than 5° C. The subsequent drying preferably takes place at slightly higher (at least 10, 15 or 20° C.) or markedly higher (at least 30, 50, 70, 90 or 110° C.) temperatures than the minimum film-forming temperature of the synthetic resins including film-forming aids. Water and optionally included organic solvents escape during drying. Film formation then starts, during which process the organic substances, optionally in particle form, can move closer together, become softer due to the higher temperature and can form a closed film. It is particularly preferable for film forming to take place to a substantial extent at just room temperature.

The following can preferably be used as the at least one crosslinker: inorganic crosslinkers such as e.g. ammonium-zirconium carbonate, organometallic crosslinkers such as e.g. those based on organotitanate, those based on organozirconate, organic crosslinkers such as e.g. adipic dihydrazide, those based on aziridine such as e.g. polyfunctional polyaziridine, those based on an azo compound, those based on diamine, those based on diimide, such as e.g. polyfunctional polycarbodiimides, those based on formaldehyde such as e.g. urea-formaldehyde or/and melamine-formaldehyde, those based on imidazole such as e.g. 2-ethyl-4-methyl imidazole, those based on isocyanate, those based on isocyanurate, those based on melamine such as e.g. methoxymethyl methylol melamine or/and hexamethoxymethyl melamine, those based on peroxide, those based on triazine such as e.g. tris(alkoxycarbonylamino)triazine or/and those based on triazole.

Organic crosslinkers based on melamine-formaldehyde are conventionally used in the temperature range from around 130 to around 210° C., preferably in the range from around 140 to around 200° C., whilst the other organic crosslinkers are mostly or conventionally used in a temperature range from around 50 to around 120° C., preferably in the range from around 60 to around 110 or to around 100° C. These last crosslinkers are referred to here as organic low-temperature crosslinkers.

The aqueous composition according to the invention for coating purposes can contain at least one crosslinker based in particular on a basic compound to bring about resistance to aggressive media such as chemicals and weathering influences and to mechanical loading and to ensure colour stability, particularly in the case of aluminium and aluminium-containing surfaces in conditions of high atmospheric humidity or/and in humid areas, and to prevent darkening. In particular these are such inorganic crosslinkers which can be used in a basic medium, above all those based on titanium, hafnium or/and zirconium or/and those based on carbonate or ammonium carbonate. Advantageous above all are crosslinkers based on titanium, hafnium or/and zirconium or/and those based on carbonate or ammonium carbonate, above all those based on titanium or/and zirconium; they are preferably included in the aqueous composition in a content in the range from 0.1 to 30 g/l based on solids including active ingredients and particularly preferably in a content in the range from 1 to 10 g/l or preferably in a content in the range from 0.01 to 3 parts by weight, particularly preferably in the range from 0.1 to 1 parts by weight, most particularly preferably in the range from 0.2 to 0.6 parts by weight, based on 100 parts by weight of water. The aqueous composition preferably contains at least one inorganic crosslinker based on a boron-containing compound or a basic compound, preferably at least one inorganic crosslinker based on titanium, hafnium or/and zirconium or/and based on carbonate or ammonium carbonate.

The at least one inorganic crosslinker in the aqueous composition can preferably be selected from at least one compound based on aluminium, hafnium, titanium, vanadium, zinc or/and zirconium. It can be particularly suitable for at least partially crosslinking one of the synthetic resins contained in the coating composition or/and for being chemically reacted with at least one of the synthetic resins contained therein. The crosslinking process, including the chemical reaction, can take place in particular by chemical or/and by chemical/thermal means. Chelates are not crosslinkers within the meaning of this application, however. The compositions according to the invention are preferably free from chelates. The inorganic crosslinker has a crosslinking effect in particular between groups such as the OH groups of the inorganic crosslinker and groups such as the COOH groups of the synthetic resins. The at least one inorganic crosslinker can often also act as a reaction catalyst or/and partially as a corrosion inhibitor. It can help to improve resistance to aggressive media such as chemicals and weathering influences and to mechanical loading, to improve or to ensure colour stability, particularly in the case of aluminium and aluminium-containing surfaces in conditions of high atmospheric humidity or/and humid areas, and to prevent or markedly reduce darkening of a transparent coating. In some embodiments it can be suitable for being present in the substantially neutral or/and alkaline aqueous composition in a stable form with a long shelf life, for remaining permanently homogeneously distributed and dispersed therein or/and for remaining scarcely reactive or unreactive and thus stable in storage at temperatures below e.g. about 40 or 45° C. but above e.g. about 45 or 50° C. for making possible the desired reaction with the synthetic resins.

Such inorganic crosslinkers including inorganic-organic crosslinkers can for example be those based on acetates, ammonium hydroxides, ammonium carbonates, ammonium carboxylates, carboxylic acids, carboxylic acid derivatives, halides, hydroxyhalides, orthosulfates, oxyhalides or/and propionates, in particular the ammonium, potassium and sodium salts thereof, particularly preferably ammonium zirconium carbonate, ammonium zirconium carbonate, ammonium zirconium lactate, ammonium zirconium acetate, zirconium acetate, zirconium propionate, zirconium sulfate, zirconium nitrate, zirconium hydroxychloride, zirconium oxychloride, zirconium phosphate, zirconium alkali carbonates such as e.g. zirconium potassium carbonate, zirconium ammonium fluoride, zirconium gluconate, zirconium oxide, zirconium tartrate or/and corresponding compounds of aluminium, hafnium, titanium, vanadium, zinc or a plurality of those cited here or/and with further cations not cited here, such as e.g. ammonium zinc carbonate, titanium ammonium oxalate or/and titanium ammonium carbonate. Chelates are not included in the inorganic crosslinkers, however. At least one inorganic crosslinker has a pH in the range from 5 to 10 in water at the corresponding concentration. The at least one inorganic crosslinker optionally including inorganic-organic crosslinkers is included in the aqueous composition—in particular in the bath—preferably in a content in the range from 0.01 to 100 g/l, particularly preferably in the range from 0.1 to 80 g/l, 0.15 to 60 g/l, 0.2 to 45 g/l, 0.25 to 35 g/l, 0.3 to 30 g/l, 0.35 to 25 g/l or 0.4 to 20 g/l, most particularly preferably in the range from 0.5 to 18 g/l, 0.6 to 16 g/l, 0.7 to 14 g/l, 0.8 to 12 g/l, 0.9 to 10 g/l, 1 to 8 g/l, 1.5 to 6 g/l or 2 to 4 g/l. The content of inorganic crosslinkers optionally including inorganic-organic crosslinkers is preferably in the range from 0.01 to 20 wt. % of the solids including active ingredients in the composition according to the invention, particularly preferably in the range from 0.1 to 18, 0.5 to 16, 1 to 14, 1.5 to 12, 2 to 10, 3 to 8 or 4 to 6 wt. %. The content of the at least one inorganic crosslinker in the aqueous composition is, however, substantially dependent inter alia on the type of coating line, its speed and in particular on the desired dry film thickness of the coating to be produced. A combination of at least two inorganic crosslinkers can be of interest in the embodiments, particularly if the properties of the coating are to be selectively adjusted or in order to introduce a heavier, readily analysable second cation whose content can be readily analysed, thereby allowing the film thickness to be measured.

The ratio by weight of the contents of organic film former to contents of inorganic crosslinker optionally including inorganic-organic crosslinkers in the aqueous composition—in particular in the bath—can vary widely; in particular it can be ≤(100:0.3). This ratio is preferably in the range from 100:10 to 100:0.4, from 100:5 to 100:0.5 or from 100:2.5 to 100:0.6, particularly preferably in the range from 100:2 to 100:0.75, from 100:1.6 to 100:0.9 or from 100:1.4 to 100:1.

Particular inorganic or/and organic crosslinkers can be selected according to the drying or/and crosslinking temperatures. Depending on the drying or/and crosslinking temperature to be used, at least one polyfunctional aziridine (e.g. active in the range from 40 to 250° C.), at least one carbodiimide such as e.g. at least one polycarbodiimide (e.g. in the range from 80 to 250° C.), at least one preferably blocked isocyanate (e.g. in the range from 80 to 250° C.), at least one melamine formaldehyde (e.g. in the range from 120 to 250° C.), at least one triazine (e.g. in the range from 100 to 250° C.) or/and at least one diamine (e.g. in the range from 60 to 250° C.) can be used, for example. A blocked isocyanate can be disadvantageous, however, if it causes the reaction to proceed extremely slowly and for that reason it is unsuitable for low-temperature drying of strip treatments. In comparison to a melamine-based crosslinker, a triazine-based crosslinker has the advantage that no formaldehyde is released during the thermal reaction (drying, crosslinking).

The addition of an inorganic crosslinker is recommended in particular for zinc-containing metallic surfaces, above all if EZ (electrogalvanised) and HDG (hot-dip galvanised) surfaces require good protection against corrosion. On the other hand it can be advantageous, particularly for protecting iron and steel surfaces such as e.g. cold-rolled steel (CRS) surfaces, to add at least one boron-containing inorganic compound such as one based e.g. on at least one tetraborate or/and borax. In both cases this can be achieved by adding at least one such inorganic compound.

The content of at least one such inorganic compound in the aqueous composition—in particular in the bath—can be preferably 0.01 to 50 g/l based on solids including active ingredients, particularly preferably 0.08 to 35 g/l, most particularly preferably 0.2 to 25 g/l, 0.3 to 20 g/l or 0.5 to 16 g/l, in particular 1 to 12 g/l, 2 to 10 g/l, 3 to 8 g/l or 4 to 6 g/l. The ratio by weight of the contents of organic film former to contents of such inorganic compounds in the aqueous composition—in particular in the bath—can vary widely; in particular it can be ≤1200:1. This ratio is preferably in the range from 20:1 to 800:1, from 30:1 to 600:1 or from 40:1 to 400:1, particularly preferably in the range from 50:1 to 200:1, from 60:1 to 160:1 or from 70:1 to 120:1.

The crosslinkers can be used to bring about chemical reactions or/and crosslinking reactions in the coating according to the invention in specific temperature ranges depending on the crosslinker.

The contents of the at least one crosslinker can vary very widely, depending on its type, on the synthetic resins involved or/and on the desired coating properties or/and also on the combination of different crosslinkers in the aqueous composition. The at least one crosslinker is preferably chosen so that the crosslinking reactions do not start or do not substantially start in the aqueous composition before the coating is applied. Optionally an addition of at least one reaction blocker or/and at least one stabiliser, which helps to suppress the crosslinking reactions in the aqueous composition before the coating is applied, is advantageous.

The content of at least one crosslinker in the aqueous composition is preferably in the range from 0.2 to 80 g/l based on solids including active ingredients or from 0.5 to 50 g/l, particularly preferably in the range from 1.5 to 35 g/l, from 3 to 20 g/l or from 6 to 10 g/l.

The ratio of the contents of organic film former to contents of crosslinker(s) in the aqueous composition can vary widely; in particular it can be ≤(100:0.1). This ratio is preferably in the range from 100:0.2 to 100:20, from 100:0.5 to 100:16 or from 100:1 to 100:14, particularly preferably in the range from 100:1.5 to 100:12, from 100:2 to 100:10 or from 100:3 to 100:8.

The aqueous composition preferably contains at least one crosslinker, each of which can be inorganic or/and organic in nature. In this respect the addition or/and content of at least one silane, silanol or/and siloxane to or/and in the aqueous composition, which in some cases can also have a crosslinking effect to some extent, is not deemed to be a "crosslinker" within the meaning of this patent application.

In the process according to the invention at least one wax can be selected from the group consisting of paraffins, polyethylenes and polypropylenes and added to the aqueous composition as a lubricant, which in some cases can also serve as a forming agent, in particular at least one oxidised wax or/and at least one microcrystalline wax. The lubricants are preferably wholly or substantially free from halogens such as e.g. fluorine. It is particularly advantageous to use the wax as an aqueous or/and a cationically, anionically or/and sterically stabilised dispersion, because it can then easily be held in a homogeneous distribution in the aqueous composition. The melting point of the wax used as lubricant is preferably in the range from 40 to 165° C., particularly preferably in the range from 50 to 160° C., in particular in the range from 100 to 165° C. or in the range from 120 to 150° C.

It is particularly advantageous to add, in addition to a lubricant having a melting point in the range from 100 to 165° C., a lubricant having a melting point in the range from 45 to 95° C., in particular in quantities of 2 to 30 wt. %, preferably 5 to 20 wt. %, of the total solids content, i.e. based on solids including active ingredients, for example at least one polyethylene wax and at least one paraffin. The latter can also advantageously be used alone as the sole lubricant. The ratio by weight of the lubricant having a higher melting point to the lubricant having a lower melting point is preferably 2:1 to 1:2, particularly preferably 3:2 to 2:3, 4:3 to 3:4 or is close to or exactly 1:1.

The at least one lubricant, which in some cases can also be a forming agent, is preferably contained in the aqueous composition in a content in the range from 0.1 to 35 g/l based on solids including active ingredients and particularly preferably in a content in the range from 2 to 30 g/l or 10 to 25 g/l. In some embodiments, however, a wax content is only advantageous if the coating according to the invention is a treatment coat that is not intended to be overcoated, since the wax content in a pretreatment coat can be disadvantageous when it is painted. A lubricant or/and forming agent can be added to reduce the coefficient of friction of the coating, particularly during forming. Paraffin, polyethylene or/and oxidised polyethylene are recommended inter alia for this purpose.

The content of at least one lubricant in the aqueous composition—in particular in the bath—can be preferably 0.01 to 50 g/l, particularly preferably 0.08 to 35 g/l, most particularly preferably 0.2 to 25 g/l, 0.3 to 20 g/l or 0.5 to 16 g/l, in particular 1 to 12 g/l, 2 to 10 g/l, 3 to 8 g/l or 4 to 6 g/l. The ratio by weight of the contents of organic film former to contents of lubricants in the aqueous composition—in particular in the bath—can vary widely; in particular it can be≤(100:0.1). This ratio is preferably in the range from 100:5 to 100:0.12, from 100:3.5 to 100:0.16 or from 100:2.5 to 100:0.25, particularly preferably in the range from 100:2 to 100:0.4, from 100:1.6 to 100:0.6 or from 100:1.3 to 100:0.8.

The at least one lubricant is preferably contained in the aqueous composition in a content in the range from 0.1 to 25 g/l and particularly preferably in a content in the range from 1 to 15 g/l. A wax content is particularly advantageous if the coating according to the invention is a treatment coat that is not intended to be overcoated, since in some embodiments the wax content in a pretreatment coat can be disadvantageous when it is painted. The lubricant can also be added to reduce the coefficient of friction of the coating, particularly during forming. Paraffin, polyethylene, polypropylene, oxidised polyethylene or/and oxidised polypropylene are recommended inter alia for this purpose. Surprisingly it has been found that coatings produced with the composition according to the invention are highly suitable both for pretreatments that are then painted and for other types of coating, since in an unexpectedly large number of embodiments they are readily paintable.

At least one wax together with a polymer mixture or/and copolymer containing ethylene or/and propylene and (meth)acrylic acid, such as e.g. ethylene-(meth)acrylic acid copolymer, is preferably used as the lubricant, at least one further synthetic resin optionally being added, in particular in a ratio of wax to the polymer mixture or/and copolymer containing ethylene or/and propylene and acrylic acid of 0.02:1 to 2:1, particularly preferably 0.05:1 to 1:1, most particularly preferably 0.1:1 to 0.5:1.

The aqueous composition preferably contains several lubricants, in particular two or three lubricants, of which at least two lubricants have markedly different properties from one another. At least one lubricant, in particular at least one wax, or a combination of at least two lubricants, in particular at least one of which is a wax, having markedly different melting points or melting ranges is advantageous for forming the substrates coated with the preparation. The melting point or melting range of two lubricants can differ by at least 15° C. For the sake of simplicity, only melting point is referred to below. The coefficient of friction of the coating can be adjusted in this way so that an optimal sliding of the coated substrates in the forming tools is ensured. This means that the treated substrate surfaces have such good surface slip that an optimal fit of the formed part to be produced can be achieved thanks to optimal hold-down pressure of the tools. If the surface of the coated substrate does not have adequate surface slip, there is a risk of an unwanted tapering of the substrate in the form areas during forming, usually with no substantial reduction in the wall thickness, as a result of which the substrate dimensions are unintentionally reduced in the form, which reduction can in the worst-case scenario cause the substrate to break. If the surface slip of the coated substrate surface is too high, there can be a risk that the strip coated according to the invention cannot be wound into a sufficiently stable coil. Furthermore, in single-sheet production there is a risk that during punching of small parts in particular or/and during roll forming or/and during trimming of formed parts the strip cannot be fed accurately, resulting in inadequate dimensional stability of the formed parts to be produced. A combination of at least two different waxes can preferably be selected in this respect so that a satisfactory paint adhesion of the coating according to the invention to the layer of powder coating or wet organic solvent-based or/and water-based paint that is subsequently applied can be ensured.

It has been found that an addition of at least one silane, silanol or/and siloxane markedly improves the corrosion protection, the paint adhesion to subsequent coatings or/and the chemical resistance. During coating, heating, drying or/and crosslinking, the content of silane, silanol or/and siloxane can turn into silanol/siloxane/polysiloxane or/and into silylated organic polymer/copolymer/block copolymer/graft copolymer. A combination of at least two or at least three compounds based on silane, silanol or/and siloxane can be of interest in particular in embodiments where a specific combination of properties is to be established or/and where the hydrolysis or/and stability conditions of corresponding solutions/dispersions are to be optimised. In particular, a combination of at least one organofunctional silane, silanol or/and siloxane with at least one bifunctional or/and polyfunctional silane, silanol or/and siloxane can be of particular interest in this respect. At least one silane, silanol or/and siloxane is preferably added in the not previously hydrolysed, in the partially hydrolysed, in the largely or/and in the completely hydrolysed state. The at least one silane, silanol or/and siloxane is preferably added as one of the last components or as the last component of the aqueous composition already containing synthetic resin(s) and most or all of the other components, as a result of which the reaction between synthetic resin and silane, silanol or/and siloxane proceeds less strongly or/and only slowly.

The aqueous composition preferably contains at least one substance based on silane, silanol or/and siloxane. For some metallic surfaces such as e.g. Galvalume®, it has proved advantageous to add at least one silane, silanol or/and siloxane to the aqueous compositions.

At least one non-hydrolysed, partially hydrolysed or/and completely hydrolysed silane or/and at least one corresponding silanol or/and siloxane is preferably added to the aqueous composition. The aqueous composition preferably contains at least one partially hydrolysed or/and completely hydrolysed silane or/and at least one corresponding silanol or/and siloxane. In many embodiments it has proved advantageous, if a silane-based compound is to be added, to at least partially hydrolyse a silane before adding it and to add this pre-hydrolysate to the aqueous composition. A content of at least one silane, silanol or/and siloxane calculated as silane in the range from 0.03 to 50 g/l based on solids including active ingredients is preferably added to the aqueous composition, particularly preferably in the range from 0.3 to 30 g/l, from 0.4 to 15 g/l, from 0.5 to 8 g/l, from 0.6 to 4 g/l or from 0.7 to 2 g/l. The content in the aqueous composition of at least one silane, silanol or/and siloxane calculated as silane is preferably 0.1 to 50 g/l, particularly preferably 0.2 to 35 g/l, most particularly preferably 0.3 to 20 g/l, in particular 0.5 to 10 g/l or 0.7 to 2 g/l.

The ratio of the contents of organic film former to contents of at least one silane, silanol or/and siloxane calculated as silane in the aqueous composition can vary widely; in particular it can be ≤(100:0.05). This ratio is preferably in the range from 100:10 to 100:0.1, from 100:8 to 100:0.15 or from 100:6 to 100:0.25, particularly preferably in the range from 100:4 to 100:0.35, from 100:2.5 to 100:0.45 or from 100:1.2 to 100:0.55.

In the process according to the invention it can be preferable for the aqueous composition to contain at least one partially hydrolysed or completely hydrolysed silane or/and at least one siloxane. This then offers the advantage that adhesive bridges form between the substrate and the dried protective film and any subsequently applied paint layers or/and plastic coatings, as a result of which an improved paint adhesion is also achieved. A further advantage is the fact that suitable silanes/silanols/siloxanes produce adhesive bridge-like crosslinkings within the dried protective film which substantially improve the strength or/and the flexibility of the coating composite and the adhesion to the substrate, as a result of which an improved adhesion is achieved in many paint systems. The less the added silane is hydrolysed, the more reactive it can be. Thus in some embodiments it can be advantageous to use a non-hydrolysed or virtually non-hydrolysed silane that is either without a solvent or is contained in an anhydrous organic solvent.

The silane can be an acyloxysilane, an alkyl silane, an alkyl trialkoxysilane, an aminosilane, an aminoalkyl silane, an aminopropyl trialkoxysilane, a bis-silyl silane, an epoxysilane, a fluoroalkyl silane, a glycidoxysilane such as e.g. a glycidoxyalkyl trialkoxysilane, an isocyanato silane, a mercapto silane, a (meth)acrylato silane, a monosilyl silane, a polysilyl silane, a bis-(trialkoxysilylpropyl)amine, a bis-(trialkoxysilyl)ethane, a sulfur-containing silane, a bis-(trialkoxysilyl)propyltetrasulfane, a ureidosilane such as e.g. a (ureidopropyltrialkoxy)silane, a vinyl silane, in particular a vinyltrialkoxysilane or/and a vinyltriacetoxysilane, or/and at least one corresponding silanol or/and siloxane. It can for example be at least one silane mixed with a content of at least one alcohol such as ethanol, methanol or/and propanol of up to 8 wt. % based on the silane content, preferably up to 5 wt. %, particularly preferably up to 1 wt. %, most particularly preferably up to 0.5 wt. %, optionally with a content of inorganic particles, in particular in a mixture of at least one amino silane such as e.g. bis-amino silane with at least one alkoxy silane such as e.g. trialkoxysilylpropyl tetrasulfane or a vinyl silane and a bis-silyl aminosilane or a bis-silyl polysulfur silane and/or a bis-silyl aminosilane or an aminosilane and a polysilyl-functional silane. The aqueous composition can then also alternatively or additionally contain at least one silanol or/and siloxane corresponding to the above silanes. Such silanes/silanols/siloxanes which have a chain length in the range from 2 to 5 C atoms and a functional group that is suitable for reacting with polymers are preferred. An addition of at least one silane, silanol or/and siloxane can be advantageous for forming adhesive bridges or/and for promoting crosslinking of the individual synthetic resins or/and the mixtures of synthetic resins.

In some embodiments at least one at least largely or/and completely hydrolysed or/and an at least largely or/and completely condensed silane/silanol/siloxane can be added to the aqueous composition. In many embodiments a non-hydrolysed silane bonds more poorly to the metallic surface than an at least partially hydrolysed silane/silanol. In many embodiments a largely hydrolysed and non-condensed or only slightly condensed silane/silanol/siloxane bonds markedly better to the metallic surface than an at least partially hydrolysed and largely condensed silane/silanol/siloxane. In many embodiments a completely hydrolysed and largely condensed silanol/siloxane displays only a slight tendency to become chemically bonded to the metallic surface.

The at least one inorganic compound in particle form is contained in the aqueous composition preferably in a content of 0.1 to 400 g/l, particularly preferably in a range from 3 to 200 g/l, most particularly preferably from 10 to 100 g/l or from 20 to 60 g/l.

The ratio of the contents of organic film former to contents of at least one inorganic compound in particle form in the aqueous composition can vary widely; in particular it can be ≤(100:0.1). This ratio is preferably in the range from 100:25 to 100:0.5, from 100:20 to 100:1 or from 100:15 to 100:2, particularly preferably in the range from 100:12 to 100:3, from 100:10 to 100:4 or from 100:8 to 100:5.

Among the inorganic compounds in particle form, those which support the transparency of the coating according to the invention, in other words which are colourless, white or/and only very faintly coloured, are particularly preferred, such as for example aluminium oxide, barium sulfate, silicate, silicon dioxide, colloidal silicon dioxide, zinc oxide or/and zirconium oxide, to keep the visual character of the metallic surface visible with as little alteration as possible. For that reason in most cases only such particles as are colourless, white or/and only very faintly coloured are added to the aqueous composition. These particles can in particular have been precoated by the particle manufacturer.

In the process according to the invention a finely divided powder or a dispersion is added as the inorganic compound in particle form, such as e.g. a carbonate, an oxide, a silicate or a sulfate, in particular colloidal or/and amorphous particles. Particles based on at least one compound of aluminium, barium, cerium, calcium, lanthanum, silicon, titanium, yttrium, zinc or/and zirconium are particularly preferred as the inorganic compound in particle form, in particular particles based on aluminium oxide, barium sulfate, cerium dioxide, silicon dioxide, silicate, titanium oxide, yttrium oxide, zinc oxide or/and zirconium oxide. Particles having an average particle size in the range from 6 nm to 200 nm are preferably used as the inorganic compound in particle form, particularly preferably in the range from 7 to 150 nm, most particularly preferably in the range from 8 to 90 nm, even more preferably in the range from 8 to 60 nm, most preferably of all in the range from 10 to 25 nm. These particles can also take the form of a gel or sol. The particles can be alkaline-stabilised, for example, in order to achieve a better dispersion. An addition of boron to the dispersion of the inorganic compound in particle form was not necessary, nor has it been used in the examples. It is preferable for larger particles to have a platelet-like or oblong particle shape. For corrosion protection the addition of colloidal $SiO_2$ in nanoparticle size is particularly suitable, wherein the particles can be surface-coated or/and modified. Depending on the intended application, at least one inorganic compound in particle form having a hydrophilic or/and hydrophobic character is advantageously added to the aqueous composition.

The aqueous composition according to the invention can contain at least one organic corrosion inhibitor, in particular at least one based on amine(s), preferably at least one alkanolamine—particularly preferably at least one long-chain alkanolamine, at least one TPA-amine complex such as e.g. acid adduct-4-oxo-4-p-tolylbutyrate-4-ethylmorpholine, at least one polymeric ammonium salt with fatty acid, at least one amino complex of toluene propionic acid, at least one succinic acid derivative such as e.g. 2-mercapto-benzothiazolyl succinic acid or/and at least one of their amino salts, at least one titanium- or zirconium-containing organic compound, at least one conductive polymer or/and at least one thiol. The at least one organic corrosion inhibitor is preferably not highly volatile at room temperature. It can also be advantageous if it is soluble in water or/and readily dispersible in water, in particular with more than 20 g/l or at less than 1.5 wt. %. Also particularly preferable are inter alia alkyl aminoethanols such as dimethyl aminoethanol or/and complexes based on a TPA amine. These last-mentioned corrosion inhibitors can be added in particular to bring about a greater corrosion protection or to further strengthen it. The at least one organic corrosion inhibitor is particularly preferably alkaline, in particular with a pH in the range from 7 to 11 or 8 to 10. An alkaline additive based on ammonium or such as e.g. ammonia can optionally also be added. The addition of the at least one organic corrosion inhibitor is particularly advantageous in the case of metallic surfaces that are difficult to protect against corrosion, such as in the case of unpainted iron and steel surfaces, in particular in the case of surfaces of cold-rolled steel (CRS). It can help to suppress flash rusting (rapid rusting during drying).

The content of at least one organic corrosion inhibitor in the aqueous composition—in particular in the bath—can be preferably 0.01 to 50 g/l, particularly preferably 0.08 to 35 g/l, most particularly preferably 0.2 to 25 g/l, 0.3 to 20 g/l or 0.5 to 16 g/l, in particular 1 to 12 g/l, 2 to 10 g/l, 3 to 8 g/l or 4 to 6 g/l. The ratio by weight of the contents of organic film former to contents of organic corrosion inhibitors in the aqueous composition—in particular in the bath—can vary widely; in particular it can be ≤(100:0.08). This ratio is preferably in the range from 100:10 to 100:0.1, from 100:5 to 100:0.2 or from 100:2.5 to 100:0.3, particularly preferably in the range from 100:2 to 100:0.4, from 100:1.6 to 100:0.6 or from 100:1.2 to 100:0.8.

The ratio of the contents of organic film former to contents of at least one corrosion inhibitor in the aqueous composition can vary widely; in particular it can be ≤(100:0.05). This ratio is preferably in the range from 100:20 to 100:0.1, from 100:15 to 100:0.3 or from 100:10 to 100:0.5, particularly preferably in the range from 100:8 to 100:0.6, from 100:6 to 100:0.8 or from 100:4 to 100:1.

In the process according to the invention at least one organic solvent can also be added. At least one water-miscible or/and water-soluble alcohol, an ester alcohol, a glycol ether or/and N-methylpyrrolidone can be used for example as the organic solvent for the organic polymers. In many cases, however, only water with no organic solvent is preferably added. The content of organic solvent is preferably 0.01 to 100 g/l, in particular 0.1 to 20 g/l or 0.2 to 5 g/l. For strip production it is preferable to use only water and no organic solvent apart from possibly small amounts of alcohol. The ratio by weight of the contents of organic film former to contents of organic solvents in the aqueous composition—in particular in the bath—can vary widely; in particular it can be ≤(100:0.001). This ratio is preferably in the range from 100:125 to 100:0.05, from 100:80 to 100:0.2 or from 100:60 to 100:0.5, particularly preferably in the range from 100:40 to 100:1, from 100:20 to 100:1.5 or from 100:10 to 100:2.

The aqueous composition is preferably free from inorganic acids or/and organic acids. The aqueous composition according to the invention is preferably free from additions of free fluoride, of complex fluoride such as e.g. hexafluorotitanic acid or hexafluorozirconic acid or/and of fluoride bonded in any other way.

The aqueous composition is preferably largely or wholly free from chromium(VI) compounds, particularly preferably largely or wholly free from chromium(III) and chromium(VI) compounds. In individual embodiments, the aqueous composition, which is preferably largely free from chromium(VI) compounds, exhibits a chromium content of only up to 0.5 g/l on chromium-free metallic surfaces and of up to 2 g/l on chromium-containing metallic surfaces. On the other hand, in particular rare embodiments the formation of a chromate-containing film under the polymeric coating according to the invention can be desirable. If a content of chromium(III) compounds is desired, the content of chromium(III) compounds in the aqueous composition is preferably 0.01 to 100 g/l, particularly preferably 1 to 60 g/ or 5 to 30 g/, calculated as $Cr^{3+}$. The ratio by weight of the contents of organic film former to contents of chromium(III) compounds in the aqueous composition—in particular in the bath—can vary widely; in particular it can be ≤(100:0.005), calculated as $Cr^{3+}$. This ratio is preferably in the range from 100:120 to 100:0.1, from 100:100 to 100:0.5 or from 100:80 to 100:1, particularly preferably in the range from 100:60 to 100:4, from 100:40 to 100:8 or from 100:25 to 100:12.

In most embodiments it is preferable for no chromium to be added intentionally to the aqueous composition. Chromium contents arising in the bath can then be dissolved out of the metallic surface by pickling attack, derive from contents of impurities in traces or/and be entrained from upstream baths or/and from containers and pipes. Contents of cadmium, nickel, cobalt or/and copper too are preferably kept extremely low and not added. Generally, however, the chemical attack for the compositions according to the invention is so low that no steel-refining element such as e.g. chromium or nickel can be dissolved out of a steel surface. The aqueous composition according to the invention is preferably free from additions of metals from the first, second and fifth to eighth subgroup of the periodic table, optionally with the exception of chromate(s), in particular of Cr based on $Cr^{3+}$.

Particularly advantageous aqueous compositions according to the invention contain inter alia 1.) at least one synthetic resin based on polycarbonate-polyurethane and optionally at least one further synthetic resin or/and at least one further synthetic resin component such as e.g. polyester as film former, 2.) at least one film-forming aid, 3.) at least one crosslinker, 4.) at least one lubricant and 5.) a) at least one silane/silanol/siloxane or/and b) at least one inorganic compound in particle form based in particular on aluminium oxide, silicate, silicon dioxide, colloidal silicon dioxide, titanium oxide, zinc oxide or/and zirconium oxide and optionally 6.) at least one organic corrosion inhibitor and optionally 7.) at least one further additive. The aqueous composition preferably consists substantially of components 1.) to 7.).

It is also advantageous to add at least one wetting agent in order to be able to apply the wet film in a uniform surface coverage and film thickness and also imperviously and without flaws. Many wetting agents are suitable for this purpose in principle, preferably acrylates, silanes, polysiloxanes or/and alcohols, which lower the surface tension of the aqueous composition. In many cases the addition of a defoaming agent will be necessary. The useful additives that can be added in this respect, including the paint additives often used for paints, are known in principle to the person skilled in the art.

The aqueous composition can optionally contain at least one each of a biocide, a defoaming agent, a wetting agent, a pH adjusting agent or/and at least one further additive such as is typical for paints or paint-like compositions. The addition of at least one type of additive, such as e.g. at least one polysiloxane, which contributes to a good wetting and to the flow of the applied treatment film, or/and at least one defoaming agent, such as e.g. at least one mineral oil defoaming agent to reduce foaming under mechanical loading of the aqueous composition during application, is particularly advantageous. Furthermore, at least one paint additive such as is often added to a paint or primer can also be added. The content of such additives in the aqueous composition is preferably in the range from 0.05 to 50 g/l, particularly preferably in the range from 0.2 to 40 g/l, from 0.5 to 30 g/l, from 1 to 20 g/l or from 2 to 10 g/l. The ratio by weight of contents of organic film former to contents of additives in the aqueous composition—in particular in the bath—can vary widely; in particular it can be ≤(100:0.001). This ratio is preferably in the range from 100:25 to 100:0.05, from 100:20 to 100:0.2 or from 100:15 to 100:0.4, particularly preferably in the range from 100:10 to 100:0.6, from 100:8 to 100:0.8 or from 100:5 to 100:1.

For a concentrate for preparing the bath composition, primarily by diluting with water, or/and for a make-up solution for adjusting the bath composition in the course of relatively long operation of a bath, use is preferably made of aqueous compositions that contain most, almost all or all of the constituents of the bath composition. The separate addition of reaction accelerators and drying accelerators, such as for example the morpholine salt of para-toluene sulfonic acid, can also be advantageous, in particular for the purpose of curing in the case of aqueous compositions containing melamine resin crosslinkers. The concentrate or/and the make-up solution can preferably have a concentration that is three to ten times more concentrated with respect to the individual constituents than the bath composition. In some cases, however, it is also possible to work directly with the "concentrate" as the bath composition, optionally after diluting with in particular water by e.g. 5 to 30%, otherwise after diluting with in particular water by 30 to 1000%.

In the case of a concentrate for dilution to the bath concentration in the bath, the contents of the components/compounds cited below are preferably in the stated range:
  Organic film former 100-700 g/l, 150-600 g/l, 200-500 g/l.
  Film-forming aid: 0.5-100 g/l, 1-80 g/l, 1.5-60 g/l.
  Inorganic crosslinkers, organic crosslinkers or/and photoinitiators: 0.5-100 g/l, 1-80 g/l, 1.5-60 g/l each.
  Lubricant: 0.5-100 g/l, 1-80 g/l, 1.5-60 g/l.
  Silanes/silanols/siloxanes calculated as silanes: 0.5-100 g/l, 1-80 g/l, 1.5-60 g/l.
  Inorganic compounds in particle form of corresponding fineness: 0.5-100 g/l, 1-80 g/l, 1.5-60 g/l.
  Organic corrosion inhibitors: 0.1-100 g/l, 1-80 g/l, 1.5-60 g/l.
  Chromium(III) compounds: 0, 0.5-100 g/l, 1-80 g/l, 1.5-60 g/l.
  Organic solvents: 0.1-100 g/l, 1-80 g/l, 1.5-60 g/l.
  Additives: 0.1-100 g/l, 0.5-80 g/l, 1-60 g/l.

The concentrations and relative weight contents previously given for the aqueous composition also apply to a concentrate according to the invention and to a make-up composition according to the invention.

If, however, a concentrate is used to produce a corresponding bath composition, in particular by diluting with water and optionally by adding at least one further substance, it is recommended to keep a concentrate A with a content of silane/silanol/siloxane separate from a concentrate B with a content of all or almost all other constituents and to bring these components together only in the bath. In this respect at least one silane, silanol or/and siloxane can optionally also be present partially or wholly in the solid state, be added in the solid state or/and added as a dispersion or solution. The content of silane/silanol/siloxane in concentrate A is preferably in the range from 0.01 to 1000 g/l, calculated on the basis of the corresponding silanols. It is particularly preferably in the range from 0.02 to 200 g/l, most particularly preferably in the range from 0.05 to 120 g/l, in particular in the range from 0.1 to 60 g/l. The concentration ranges of concentrate A or/and of the bath can also favour different contents, however, depending on the application.

With the process according to the invention the aqueous composition can be applied by roller coating, flow coating, blade coating, spattering, spraying, brushing or dipping, also dipping at elevated temperature of the aqueous composition, and optionally by subsequent squeegeeing, for example with a roller.

The aqueous composition can have a pH in the range from 6.5 to 11, preferably in the range from 7 to 10.5, from 7.5 to 10 or from 8 to 9.5. If during preparation of the aqueous composition the pH moves to values outside the range from 6.5 to 11, it is recommended that it be returned to the pH range from 6.5 to 11 or even to a still narrower working range within this range by means of a suitable addition.

The aqueous composition can be applied to the metallic surface at a temperature in particular in the range from 5 to 50° C., preferably in the range from 10 to 40° C., particularly preferably in the range from 18 to 25° C. or/and rarely also in the range from 50 to 95° C.

In some embodiments the final drying in the case of such films can continue for many days, whereas the substantial drying can be completed in just a few seconds. In some circumstances curing can last for several weeks until the state of final drying and curing is attained, wherein film formation or/and crosslinking can occur. Where required, the curing state can additionally be accelerated or/and intensified by accelerating the crosslinking by irradiation, for example with UV radiation, or/and by heating or/and also by addition of, for example, compounds containing free NCO groups and reaction thereof with the hydroxyl groups of the polymers containing carboxyl groups The drying temperature for drying of the liquid film of the aqueous composition on the metallic surface is preferably in the range from 10 to 400° C. PMT (peak metal temperature), particularly preferably in the range from 20 to 200° C., from 60 to 150° C. or from 70 to 120° C. The drying time is preferably 0.5 s to 120 min, particularly preferably 0.1 s to 30 min, 0.3 to 60 s or 0.5 s to 20 s.

The coated metallic surface can also be dried at a temperature in the range from 20 to 400° C., preferably in the range from 40 to 120° C. or in the range from 140 to 350° C., most particularly preferably at 60 to 100° C. or at 160 to 300° C. PMT (peak metal temperature)—depending on the chemical composition of the organic film formers. The requisite residence time for drying is substantially inversely proportional to the drying temperature: for example, for material in strip form 1 to 20 s at 100° C. or 1 to 3 s at 250° C., depending on the chemical composition of the synthetic resins, or 30 min at 20° C., whereas polyester resins with free carboxyl groups in combination with melamine-formaldehyde resins cannot normally be dried at temperatures below 120° C. On the other hand, coated formed parts have to be dried for significantly longer, depending inter alia on the wall thickness. Suitable drying devices for drying are in particular those based on circulated air, induction, infrared, near infrared or/and microwaves.

It is particularly preferable to use the composition according to the invention or/and the process according to the invention to produce a coating with a dry film thickness in the range from 0.01 to 10 μm, which in particular is transparent and not coloured. In principle it is possible to colour the coating e.g. with dye, with coloured or/and light-absorbing pigment or/and with coloured or/and light-absorbing particles. The film thickness of the coating according to the invention is preferably in the range from 0.1 to 6 μm, particularly preferably in the range from 0.2 to 5 μm, most particularly preferably in the range from 0.4 to 4 μm, in particular in the range from 0.7 to 2 μm.

The dried and optionally also cured film preferably has a König pendulum hardness of 30 to 220 s, preferably from 60 to 210 s, from 90 to 200 s or from 120 to 190 s, measured with a König pendulum hardness tester in accordance with DIN EN ISO 1522. The coatings produced according to the invention must only be tested on specimens with chemically identical but adequately thick coatings, not on thin coatings in the range up to 10 μm in thickness.

The dried and optionally also cured film preferably has a flexibility such that when bent over a conical mandrel in a mandrel bend test very largely in accordance with DIN ISO 6860 for a mandrel of diameter 3.2 mm to 38 mm—but without causing superficial cracking in the test surface—no cracks longer than 2 mm form which during the course of subsequent wetting with copper sulfate become visible through a change in colour due to the deposition of copper on the cracked metallic surface. The demonstration of flexibility by use of the mandrel bend test and subsequent dipping of the areas formed in this way in a copper sulfate solution in order to detect flaws ensures a reproducible test result and has the advantage that it requires no time-consuming corrosion tests, lasting for 240 hours for example, which in some cases, depending on the chemical composition and roughness of the metallic surface, can lead to variable results which can therefore only be compared with one another to a limited extent. For this test, in the case of baser metallic surfaces such as aluminium alloys, it is necessary to clean the metallic surface first by pickling prior to coating, in order to remove as much as possible of the oxide layer.

The percentage areas of detached surface in a T-bend test on formed parts such as e.g. sheets coated with coil-coating paint are preferably up to 8%, particularly preferably up to 5%, most particularly preferably up to 2%, the best values, however, being close to 0%, so that ordinarily only fine cracks then arise. For this purpose a coil-coating paint based on silicone polyester can preferably be used, in particular for comparative tests in analyses that are typical for coated coils. The freedom from cracking or/and the size of the cracks is also substantially dependent on the nature of the paint that is used, however.

In the coating of strips, the coated strips can be wound into a coil, optionally after cooling to a temperature in the range from 40 to 70° C.

At least one (further) coating consisting of paint, polymer, lacquer, functional plastic coatings, adhesive or/and adhesive support, such as for example a self-adhesive film, can be applied to the partially or wholly dried or dried and cured film, in particular a wet paint, a powder coating, a plastic coating, an adhesive inter alia for the purpose of film coating.

Furthermore it is possible for the process according to the invention to be used for the treatment of a metal surface cleaned in the conventional manner without a subsequent post-treatment, such as e.g. rinsing with water or/and with an aqueous, e.g. alkaline, rinsing solution.

The metal parts coated according to the invention with the aqueous composition, in particular strips or strip sections, can be formed, painted, coated with polymers such as e.g. PVC, printed, glued, hot-soldered, welded or/and connected to one another or to other elements by clinching or other joining methods. These processes for the coating of metallic strip for architectural applications are known in principle. The metal is generally first painted or otherwise coated and then formed. If the coating according to the invention is painted or coated with plastic, soldered or/and welded joints cannot be produced without removing the coatings at least locally.

The part having a metallic surface coated according to the invention with the aqueous composition can be a wire, a steel strip, a metal sheet, cladding, screening, a car body or car body part, a part of a vehicle, trailer, caravan or flying body, a covering, housing, lamp, light, traffic light element, an item of furniture or furniture element, an element of a domestic appliance, a frame, a profile, a formed part with complex geometry, a crash barrier element, radiator element or fencing element, a bumper, a part consisting of or having at least one pipe or/and profile, a window, door or bicycle frame, a wire winding, wire mesh or a small part.

The object is further achieved by a coated substrate having at least one metallic surface, wherein the substrate has at least one metallic surface on which a coating according to the invention was produced in accordance with the process according to the invention.

The object is finally achieved with an aqueous composition for pretreating a metallic surface prior to a further coating or for treating a metallic surface, which is characterised in that in addition to water the composition contains a) as the main component, an organic film former consisting of at least one synthetic resin, 70 to 100 wt. % of the content of synthetic resin(s) in the organic film former comprising at least one water-soluble or/and water-dispersible synthetic resin in the form of polymers, copolymers, block copolymers or/and graft copolymers based on synthetic resins selected from the group consisting of polycarbonate, polyurethane, ionomer, poly(meth)acrylate, polyester, polyether or/and polystyrene, the content of polycarbonate and polyurethane being at least 10 wt. % each, b) at least one long-chain alcohol as film-forming aid for the organic film former, c) at least one crosslinker, d) at least one lubricant, and e) A) at least one substance based on silane, silanol or/and siloxane or/and B) at least one inorganic compound in particle form with an average particle diameter measured on a scanning electron microscope in the range from 0.005 to 0.3 µm, and f) optionally at least one organic corrosion inhibitor, at least one organic solvent or/and at least one additive.

The process according to the invention represents an alternative to the cited chromate-rich or/and acid-containing processes, in particular in the area of the surface pretreatment of metal strip prior to painting. In comparison thereto it delivers similarly good results in terms of corrosion protection and paint adhesion. The coatings according to the invention are largely or wholly free from chromium(VI) compounds. In many embodiments, however, they can also be largely or wholly free from chromium(III) compounds, without thereby suffering any substantial loss of quality or any loss of quality at all.

In rare embodiments, however, the process according to the invention can also advantageously be used with a content of at least one chromate-containing compound based on $Cr^{3+}$, if corrosion protection is to be maintained to a broad extent and with a high level of reliability, particularly in the case of damage to the protective coating, which damage can be caused by mechanical loading during transport, storage and assembly of the substrates treated on the substrate surface with the coating liquid according to the invention.

Furthermore it is possible for the process according to the invention to be used for the treatment of a metal surface cleaned in the conventional manner without a subsequent post-treatment, such as rinsing with water or with an aqueous rinsing solution.

The process according to the invention is particularly suitable for the application of the aqueous composition by means of squeegee rollers or/and by means of a roll coater, wherein the aqueous composition can be dried immediately after application with no further intermediate process steps (dry-in-place technology). This simplifies the process considerably in comparison to conventional spraying or/and dip processes, for example, in particular those with subsequent rinsing steps, such as e.g. chromating or zinc phosphating, and because no rinsing process is necessary after the application, only extremely small amounts of rinsing water for plant cleaning purposes accumulate at the end of operations; this too represents an advantage over established chromium-free processes using the spray method with rinsing solutions. This rinsing water can be recycled to a new batch of bath composition.

The metallic surface to be coated according to the invention is preferably a clean metallic surface. In this context the term "clean metallic surface" means an uncleaned metallic surface for which no cleaning is required, e.g. a freshly galvanised surface, or a freshly cleaned surface.

As metallic surface(s), those consisting of aluminium, iron, copper, magnesium, nickel, titanium, tin, zinc or/and of alloys containing aluminium or/and iron, copper, magnesium, nickel, titanium, tin or/and zinc are preferably coated with the aqueous composition according to the invention. The coating according to the invention of electrogalvanised, alloy electrogalvanised, hot-dip galvanised or/and alloy hot-dip galvanised surfaces is particularly preferred. The coating according to the invention of AlSi alloys, ZnAl alloys such as Galfan®, AlZn alloys such as Galvalume®, ZnFe alloys, ZnNi alloys such as Galvanneal®, ZnTi alloys and other Zn alloys as metallic coatings or Al- and Zn-containing coatings is particularly preferred.

It is perfectly possible in this regard to use the polymeric, optionally chromate-free, coating according to the invention without prior application of an additional pretreatment coat, such that an excellent durable protection of the metallic surfaces is possible, in particular on AlSi alloys, ZnAl alloys such as Galfan®, AlZn alloys such as Galvalume®, ZnFe alloys, ZnNi alloys such as Galvanneal®, ZnTi alloys and other Zn alloys as metallic coatings or Al- and Zn-containing coatings, which protection can be achieved by application of a polymeric coating. The coating according to the invention has moreover proved itself in the case of more severely corrosion-prone metallic surfaces such as those consisting of iron and steel alloys, in particular in the case of cold-rolled steel, it being then advantageous also to add at least one corrosion inhibitor to the aqueous composition. Flash rusting during drying of the treatment liquid on cold-rolled steel (CRS) can be suppressed in this way.

A more cost-effective and environment-friendlier corrosion protection can thus be attained, which furthermore requires no expensive radical crosslinking but instead can be adequately cured simply by drying and film forming or/and by "conventional chemical" curing, Which is often known as "thermal crosslinking".

In some cases, however, it can be beneficial to obtain a reasonably hard coating quickly in a particular process step.

In such a case it can be advantageous to add at least one photoinitiator and to select at least one radically crosslinking, in particular UV crosslinking, polymer component in order to achieve a partial crosslinking on the basis of actinic radiation, in particular UV radiation. In such a case it is not absolutely necessary additionally to add at least one special radically crosslinking synthetic resin if at least one of the synthetic resins can be crosslinked both by film forming or/and by chemical or/and chemical/thermal crosslinking and by radical crosslinking. The coating according to the invention can then be cured partially by actinic radiation such as e.g. electron beam or/and UV radiation and partially by drying and film forming or/and by thermal crosslinking. The crosslinkers and photoinitiators are generally known. In such a case a) a chemical crosslinking can be followed by a chemical/thermal crosslinking, b) a chemical crosslinking can be followed by a radical crosslinking, c) a chemical/thermal crosslinking can be followed by a radical crosslinking, d) a chemical crosslinking can be followed by a chemical/thermal crosslinking and finally be a radical crosslinking. Conversely, after drying or after almost complete drying, which is possible even at relatively low temperatures, it is possible for e) a radical crosslinking, e.g. initiated by at least electron beam or/and UV radiation, to be followed by a chemical or/and by a chemical/thermal crosslinking. The latter can also be initiated during the course of the irradiation process, for example, due to heating in the line or/and additionally by heating. A particularly high degree of crosslinking is possible due to the at least double crosslinking. On the other hand it is thus possible to carry out a first crosslinking prior to forming, for example, and a second crosslinking after this forming. In this way the elasticity, formability, ductility and hardness of the polymeric coating can be adjusted as required and optionally according to the particular processing step. Drying and film forming preferably take place prior to a radical curing, however. This can be important in particular in the case of application on high-speed belt lines or/and for the first crosslinking (=curing). The proportion of radical crosslinking can make up 0 to 50% of the total possible cure, preferably 5 to 35%.

The content of at least one crosslinker or/and at least one photoinitiator in the aqueous composition—in particular in the bath—can be preferably 0.01 to 50 g/l, particularly preferably 0.08 to 35 g/l, most particularly preferably 0.2 to 25 g/l, 0.3 to 20 g/l or 0.5 to 16 g/l, in particular 1 to 12 g/l, 2 to 10 μl, 3 to 8 g/l or 4 to 6 g/l. The ratio by weight of the contents of organic film former to contents of crosslinkers or/and photoinitiators in the aqueous composition—in particular in the bath—can vary widely; in particular it can be ≤300:1. This ratio is preferably in the range from 10:1 to 250:1, from 20:1 to 200:1 or from 40:1 to 160:1, particularly preferably in the range from 50:1 to 130:1, from 60:1 to 110:1 or from 70:1 to 100:1.

The polymeric and largely or wholly chromate-free coating has the further advantage that—particularly in the case of a film thickness in the range from 0.1 to 5 μm, from 0.3 to 3 μm or from 0.8 to 2.2 μm—it is transparent and light-coloured, such that the metallic nature and the typical structure e.g. of a galvanised or of a Galvalume® surface, for example, can still be discerned through the coating, accurately and unaltered or virtually unaltered. Such thin coatings can also be welded without difficulty.

Furthermore, the polymeric coating according to the invention is highly ductile, since it can be adjusted in such a way that after coating, drying and optionally even after curing and optionally in the long term too it remains in a relatively plastic state rather than being hard and brittle.

In most embodiments the polymeric coating according to the invention can be readily overcoated with primers, paints or similar organic compositions (paintability). The polymeric coating according to the invention can be repainted or coated with a plastic such as PVC for example. This coating of the polymeric coating according to the invention can be performed by application processes such as e.g. powder coating, wet painting, flow coating, roller coating, brushing or dipping. The cured coatings produced in this way, which are applied to the polymeric coating according to the invention, wherein two, three or four paint or plastic coats can often also be applied, usually exhibit a total coating thickness in the range from 5 to 1500 μm.

The polymeric coating according to the invention can also be foam-backed without difficulty with polyurethane insulating foam, for example, in particular for the production of twin-wall sandwich elements, or can be readily bonded by means of conventional engineering adhesives such as are used in particular in vehicle construction, for example.

The coatings according to the invention can be used above all as primer coats. They are highly suitable for this purpose without and also with at least one previously applied pretreatment coat. This pretreatment coat can then be inter alia a coating based on phosphate, in particular ZnMnNi phosphate, or based on phosphonate, silane or/and a mixture based on fluoride complex, corrosion inhibitor, phosphate, polymer or/and finely divided particles. They can also be used extremely effectively, however, as pretreatment coats prior to a subsequent coating or as passivation coats without a subsequent coating.

Pretreatment coats or primer coats are obtained with the coatings according to the invention which together with the subsequently applied paint form a coating system which is comparable with very good chromium-containing coating systems.

The coatings according to the invention are inexpensive, environmentally friendly, readily producible on an industrial scale and readily useable in industry.

Surprisingly it was found that an organic film former with a substantial content of polycarbonate and polyurethane and optionally with a content of at least one other synthetic resin or/and synthetic resin constituent, optionally e.g. in the form of a copolymer, in particular based substantially on polymer, copolymer, block copolymer or/and graft copolymer based on aliphatic polycarbonate-polyurethane, is particularly highly suitable.

It was surprising that with a synthetic resin coating according to the invention, in spite of a film thickness of only approx. 0.5 to 2.5 μm, an exceptionally high-quality chromate-free film could be produced, which does not discolour the substrate surfaces and provides exceptionally good corrosion protection. It was also surprising that the addition of at least one crosslinker along with the addition of at least one silane/silanol/siloxane brought about a significant improvement in the corrosion resistance. Astonishingly, moreover, the addition of at least one organic corrosion inhibitor again markedly improved the corrosion protection. Finally, it was surprising that a considerable improvement was obtained in the chemical resistance of the coating produced according to the invention by the addition of at least one low-melting lubricant, e.g. with a melting point $T_m$ in the range from 40 to 90° C., along with at least one high-melting lubricant, e.g. with a melting point $T_m$ in the range from 100 to 160° C., possibly because residual pore spaces in the coating were closed as a consequence during drying at elevated temperature. The temperature progression of the coating during the coating process is preferably chosen so that the low-melting lubricant melts but the high-melting lubricant does not melt. In this way pores and other cavities can be filled by the low-melting lubricant.

It was surprising that in many embodiments in dry film thicknesses in the range between about 1 and 1.5 μm a chromium-free aqueous composition with an organic film former having a substantial content of polycarbonate and polyurethane offers such excellent corrosion protection in comparison to chromium-containing compositions. There was no softening of the polymeric coating according to the invention below 150° C., in other words exceptionally low thermoplasticity up to about 150° C., and high yellowing resistance in long-term exposure to temperatures of up to about 180° C.

It was surprising that in many embodiments an aqueous composition with an organic film former having a substantial content of polycarbonate and polyurethane together with a content of silane/silanol/siloxane and with an in particular inorganic crosslinker resulted in an unexpected and exceptionally high resistance to darkening in Al-containing coatings such as Galvalume®, tested in the salt spray test.

It was surprising that with a polymeric coating according to the invention, in spite of a film thickness of only approx. 0.8 to 1.6 μm, an exceptionally high-quality chromate-free film could be produced, which does not discolour the substrate surfaces and provides exceptionally good corrosion protection. It was moreover surprising that the addition of fine-particle inorganic particles also brought about a further significant improvement in corrosion resistance.

It was further surprising that in some chromate-free compositions, aqueous compositions according to the invention exhibited such high corrosion protection that when applied directly to Galvalume® surfaces in dry film thicknesses in the range between about 1 and 1.5 μm, not even early signs of black staining occurred, to which Galvalume® is otherwise highly susceptible.

The process according to the invention additionally offers the advantage over the previously described or/and practised processes that on an aluminium-rich surface or a surface coated with an aluminium-containing alloy—in particular on a steel substrate—it causes no darkening of the substrate surface nor any milky-white bloom on the substrate surface and hence can be used for the decorative design of buildings or/and building elements with no additional colour-imparting painting. The aesthetic character of the metal surface remains visible with virtually no change.

EXAMPLES AND COMPARATIVE EXAMPLES

The examples and comparative examples described below are intended to illustrate the subject matter of the invention in more detail. The stated concentrations and compositions relate to the bath compositions themselves as used in the laboratory and not to more highly concentrated batch solutions that are optionally used. On commercial strip processing lines the concentrations of corresponding aqueous compositions would conventionally be mostly two to four times higher than in the laboratory, depending on the application and the line. All stated concentrations should be understood to be solids contents including active ingredients, in other words the concentrations relate to the proportions of active components, regardless of whether the raw materials used were in diluted form, e.g. as aqueous solutions or/and dispersions. In addition to the compositions listed below, it can also be necessary or desirable in commercial practice to add other additives or/and to adjust the amounts accordingly, for example either to increase the total amount of additives or e.g. to increase the amount of defoaming agent or/and flow control agent such as a polysiloxane for example.

Synthetic resin A is a thermoplastic, anionically stabilised copolymer based on polyacrylate and polystyrene, with a König pendulum hardness according to DIN EN ISO 1522 of about 100 s. Synthetic resin B is a thermoplastic, anionically stabilised copolymer based on polyacrylate and polystyrene, with a König pendulum hardness according to DIN EN ISO 1522 of about 140 s. Synthetic resin C is a thermoplastic, anionically stabilised copolymer based on polyacrylate and polystyrene, with a König pendulum hardness according to DIN EN ISO 1522 of about 120 s. Synthetic resin D is a thermoplastic, anionically stabilised copolymer based on n-butyl acrylate and polystyrene, with a König pendulum hardness according to DIN EN ISO 1522 of about 30 s. Synthetic resin E is a thermoset, anionically stabilised copolymer based on aliphatic polyurethane and polycarbonate, with a König pendulum hardness according to DIN EN ISO 1522 of about 200 s. Synthetic resin F is a thermoset, anionically stabilised copolymer based on aliphatic polyurethane and polycarbonate, with a König pendulum hardness according to DIN EN ISO 1522 of about 175 s. Synthetic resin G is a thermoset/thermoplastic, anionically stabilised copolymer based on aliphatic polyester-polyurethane and polyacrylate, with a König pendulum hardness according to DIN EN ISO 1522 of about 100 s. Synthetic resin H is a thermoset/thermoplastic, anionically stabilised copolymer based on aliphatic polycarbonate-polyurethane and polyacrylate, with a König pendulum hardness according to DIN EN ISO 1522 of about 105 s. Synthetic resin K is a thermoplastic, anionically stabilised copolymer based on polyethylene and polyacrylate, with a König pendulum hardness according to DIN EN ISO 1522 of about 40 s. Synthetic resin L is a thermoset, anionically stabilised polymer based on polyether, with a König pendulum hardness according to DIN EN ISO 1522 of about 80 s. Synthetic resin M is a thermoplastic, anionically stabilised polymer based on methacrylic acid, with a König pendulum hardness according to DIN EN ISO 1522 of about 70 s.

The colloidal silicon dioxide exhibits particle sizes substantially in the range from 5 to 50 nm and an average particle size substantially in the range from 10 to 20 nm.

Wax 1 is a cationically stabilised oxidised polyethylene wax (HDPE) with a melting point of about 130° C. Wax 2 is an anionically stabilised paraffin wax with a melting point in the range from 56 to 80° C. Wax 3 is an anionically stabilised paraffin wax with a melting point of about 95° C. They were used as lubricants and forming agents.

The defoaming agent is a mixture of hydrocarbons, hydrophobic silica, oxalated compounds and non-ionogenic emulsifiers. The polysiloxane is a polyether-modified dimethyl polysiloxane and was used as a wetting agent and flow control agent for the wet film during application.

The film-forming aid is a tripropylene glycol mono-n-butyl ether, which as a long-chain alcohol was used for film forming.

Silane 1 is a non-stabilised epoxy-functional alkoxysilane, which was added in the non-hydrolysed state. Silane 2 is a stabilised epoxy-functional alkoxysilane, which was added in the non-hydrolysed state. Silane 3 is a non-stabilised epoxy-functional alkoxysilane, which was added in the non-hydrolysed state. Their crosslinking starts at about 45° C. and preferably proceeds in the range from 60 to 150° C. The silanes contribute to a corrosion-inhibiting crosslinking.

Organic crosslinker 1 is a crosslinker based on polycarbodiimine. Its crosslinking starts at about 80° C. and preferably proceeds in the range from 100 to 130° C. Organic crosslinker 2 is a crosslinker based on trifunctional polyaziridine. Its crosslinking starts at about 50° C. and preferably proceeds in the range from 60 to 120° C. Organic crosslinker 3 is a crosslinker based on triazine. Its crosslinking starts at about 100° C. and preferably proceeds in the range from 120 to 200° C. Organic crosslinker 4 is a crosslinker based on alkoxyalkyl melamine. Its crosslinking starts at about 130° C. and preferably proceeds in the range from 150 to 200° C. Inorganic crosslinker 5 is a crosslinker based on zirconium carbonate. Its crosslinking starts at about 40° C. and preferably proceeds in the range from 60 to 150° C. Inorganic crosslinker 6 is likewise a crosslinker based on zirconium carbonate. Its crosslinking starts at about 40° C. and preferably proceeds in the range from 60 to 150° C.

The organic corrosion inhibitor is a titanium-containing compound.

A) Coating of Galvalume® Steel Sheets

Examples E1 to E31 According to the Invention and Comparative Examples CE1 to CE12

Steel sheets which were obtained from commercial cold-rolled and subsequently alloy galvanised steel strip e.g. with 55% AlZn (Galvalume®) and which were oiled during storage for the purposes of protection were first degreased in an alkaline spray cleaner, rinsed with water and dried at elevated temperature. The constituents were mixed together and the pH of the aqueous dispersion was then adjusted to 8.2 using an ammonia solution. The bath composition consisted of the aqueous composition according to Table 1. A defined amount of the aqueous composition was then applied using a roll coater in such a way that a wet film thickness of about 10 ml/m$^2$ was achieved. The wet film was then dried at temperatures of about 70° C., about 100° C. or about 150° C. PMT, made into a film and more or less cured. Heating was applied only during drying. Thus crosslinking took place substantially only during drying and subsequently as post-crosslinking. The steel sheets treated in this way were then tested for their corrosion protection, their mechanical properties and other properties. All tests were performed after a storage time of 24 h.

The properties determined on the polymeric coatings are rated in the tables under the test results with marks from 1 to 5, where 1 is very good and 5 is inadequate. In the case of Galvalume® the mark for corrosion protection is an average for results from the condensation climate test with constant humidity and air temperature, the condensation climate test with alternating humidity and air temperature, the salt spray test and the wet pack test (condensation formation on passing through various climate zones).

TABLE 1

Compositions of the aqueous compositions applied to Galvalume ® and properties of the coatings produced therewith

| Content in g/l | Example | | | | | | | | | | |
|---|---|---|---|---|---|---|---|---|---|---|---|
| | CE1 | CE2 | CE3 | CE4 | E1 | E2 | CE5 | E3 | CE6 | E4 | E5 |
| Water | 896.0 | 896.0 | 896.0 | 896.0 | 896.0 | 896.0 | 896.0 | 896.0 | 896.0 | 896.0 | 896.0 |
| Synthetic resin A | 81.1 | | | | | | | | | | |
| Synthetic resin B | | 81.1 | | | | | | | | | |
| Synthetic resin C | | | 81.1 | | | | | | | | |
| Synthetic resin D | | | | 81.1 | | | | | | | |
| Synthetic resin E | | | | | 81.1 | | | | | | |
| Synthetic resin F | | | | | | 81.1 | | | | 41.0 | 41.0 |
| Synthetic resin G | | | | | | | 81.1 | | | 40.1 | |
| Synthetic resin H | | | | | | | | 81.1 | | | 40.1 |
| Synthetic resin K | | | | | | | | | 81.1 | | |
| Colloidal SiO$_2$ | 6.1 | 6.1 | 6.1 | 6.1 | 6.1 | 6.1 | 6.1 | 6.1 | 6.1 | 6.1 | 6.1 |
| Wax 1 | 5.9 | 5.9 | 5.9 | 5.9 | 5.9 | 5.9 | 5.9 | 5.9 | 5.9 | 5.9 | 5.9 |
| Wax 2 | | | | | | | | | | | |
| Defoaming agent | 0.8 | 0.8 | 0.8 | 0.8 | 0.8 | 0.8 | 0.8 | 0.8 | 0.8 | 0.8 | 0.8 |
| Polysiloxane | 0.6 | 0.6 | 0.6 | 0.6 | 0.6 | 0.6 | 0.6 | 0.6 | 0.6 | 0.6 | 0.6 |
| Film-forming aid | 7.6 | 7.6 | 7.6 | 7.6 | 7.6 | 7.6 | 7.6 | 7.6 | 7.6 | 7.6 | 7.6 |
| Silane 1 | 0.4 | 0.4 | 0.4 | 0.4 | 0.4 | 0.4 | 0.4 | 0.4 | 0.4 | 0.4 | 0.4 |
| Inorganic crosslinker 5 | 1.5 | 1.5 | 1.5 | 1.5 | 1.5 | 1.5 | 1.5 | 1.5 | 1.5 | 1.5 | 1.5 |
| Inorganic crosslinker 6 | | | | | | | | | | | |
| Ammonium bichromate | | | | | | | | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 100 | 100 | 100 | 100 | 100 | 100 |
| Test results | | | | | | | | | | | |
| Dry film thickness, g/m$^2$ | 1.2 | 1.2 | 1.2 | 1.2 | 1.2 | 1.2 | 1.2 | 1.2 | 1.2 | 1.2 | 1.2 |
| Corrosion resistance | 3 | 4 | 4 | 3 | 2 | 2 | 4 | 4 | 1 | 3 | 3 |
| Resistance to mechanical influence | 3 | 4 | 2 | 4 | 1 | 1 | 3 | 3 | 2 | 3 | 1 |
| Blocking resistance | 4 | 3 | 4 | 5 | 1 | 1 | 3 | 3 | 5 | 3 | 2 |
| Outdoor weathering | 4 | 3 | 4 | 5 | 1 | 1 | 3 | 3 | 5 | 3 | 3 |
| Formability | 2 | 2 | 2 | 2 | 2 | 2 | 2 | 2 | 2 | 2 | 2 |
| Resistance to acids and lyes | 4 | 4 | 4 | 4 | 2 | 2 | 4 | 4 | 5 | 4 | 4 |
| Yellowing resistance at elevated temperature (60 min at 200° C.) | 2 | 2 | 3 | 3 | 2 | 2 | 3 | 2 | 5 | 3 | 2 |
| Paintability | 4 | 4 | 4 | 4 | 1 | 1 | 3 | 3 | 2 | 3 | 3 |

TABLE 1-continued

Compositions of the aqueous compositions applied to Galvalume ® and properties of the coatings produced therewith

| Content in g/l | Example | | | | | | | | | | |
|---|---|---|---|---|---|---|---|---|---|---|---|
| | E6 | E7 | E8 | E9 | E10 | E11 | E12 | E13 | E14 | E15 | E16 |
| Water | 896.0 | 896.0 | 896.0 | 896.0 | 896.0 | 844.0 | 844.0 | 844.0 | 896.0 | 896.0 | 896.0 |
| Synthetic resin A | 20.0 | | | | | | 30.0 | 55.0 | | | |
| Synthetic resin B | | | | | | | | | | | |
| Synthetic resin C | | | | | | | | | | | |
| Synthetic resin D | | | | | | | | | | | |
| Synthetic resin E | | | | | | | | | 81.1 | 77.1 | 66.7 |
| Synthetic resin F | 40.0 | 41.0 | 81.1 | 79.1 | 77.1 | 118.7 | 88.7 | 63.7 | | | |
| Synthetic resin G | | | | | | | | | | | |
| Synthetic resin H | 21.1 | | | | | | | | | | |
| Synthetic resin K | | 40.1 | | | | | | | | | |
| Colloidal SiO$_2$ | 6.1 | 6.1 | 6.1 | 6.1 | 6.1 | 9.2 | 9.2 | 9.2 | 6.1 | 6.1 | 9.2 |
| Wax 1 | 5.9 | 5.9 | 5.9 | 2.0 | 2.0 | 3.0 | 3.0 | 3.0 | 5.9 | 2.0 | 3.0 |
| Wax 2 | | | | 5.9 | 7.9 | 8.9 | 8.9 | 8.9 | | 7.9 | 8.9 |
| Defoaming agent | 0.8 | 0.8 | 0.8 | 0.8 | 0.8 | 1.2 | 1.2 | 1.2 | 0.8 | 0.8 | 1.2 |
| Polysiloxane | 0.6 | 0.6 | 0.6 | 0.6 | 0.6 | 0.9 | 0.9 | 0.9 | 0.6 | 0.6 | 0.9 |
| Film-forming aid | 7.6 | 7.6 | 7.6 | 7.6 | 7.6 | 11.3 | 11.3 | 11.3 | 7.6 | 7.6 | 11.3 |
| Silane 1 | 0.4 | 0.4 | 0.4 | 0.4 | 0.4 | 0.6 | 0.6 | 0.6 | 0.4 | 0.4 | 0.6 |
| Inorganic crosslinker 5 | 1.5 | 1.5 | 1.5 | 1.5 | 1.5 | 2.2 | 2.2 | 2.2 | 1.5 | 1.5 | 2.2 |
| Inorganic crosslinker 6 | | | | | | | | | | | |
| Ammonium bichromate | | | | | | | | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 100 | 100 | 100 | 100 | 100 | 100 |
| Test results | | | | | | | | | | | |
| Dry film thickness, g/m$^2$ | 1.2 | 1.2 | 1.2 | 1.2 | 1.2 | 1.7 | 1.7 | 1.7 | 1.2 | 1.2 | 1.2 |
| Corrosion resistance | 2 | 1 | 1 | 1 | 1 | 1 | 2 | 2 | 1 | 1 | 1 |
| Resistance to mechanical influence | 2 | 2 | 1 | 1 | 1 | 1 | 1 | 1 | 1 | 1 | 1 |
| Blocking resistance | 2 | 5 | 1 | 1 | 1 | 1 | 2 | 3 | 1 | 1 | 1 |
| Outdoor weathering | 3 | 4 | 1 | 1 | 1 | 1 | 2 | 3 | 1 | 1 | 1 |
| Formability | 2 | 2 | 2 | 1 | 1 | 1 | 1 | 1 | 2 | 1 | 1 |
| Resistance to acids and lyes | 4 | 3 | 3 | 1 | 1 | 1 | 1 | 1 | 2 | 1 | 1 |
| Yellowing resistance at elevated temperature (60 min at 200° C.) | 2 | 5 | 2 | 2 | 2 | 2 | 2 | 2 | 2 | 2 | 2 |
| Paintability | 2 | 2 | 1 | 1 | 1 | 1 | 2 | 3 | 1 | 1 | 1 |

| Content in g/l | Example | | | | | | | | | | |
|---|---|---|---|---|---|---|---|---|---|---|---|
| | E17 | E18 | E19 | E20 | E21 | E22 | E23 | E24 | E25 | E26 | E27 |
| Water | 896.0 | 896.0 | 896.0 | 896.0 | 896.0 | 896.0 | 896.0 | 896.0 | 896.0 | 896.0 | 896.0 |
| Synthetic resin A | 20.0 | 40.0 | | 20.0 | 40.0 | | | | | | |
| Synthetic resin B | | | | | | | | | | | |
| Synthetic resin C | | | | | | | | | | | |
| Synthetic resin D | | | | | | | | | | | |
| Synthetic resin E | | | | | | | 79.1 | 79.1 | 77.6 | 79.2 | 85.2 |
| Synthetic resin F | 59.1 | 39.1 | 79.1 | 59.1 | 39.1 | 79.1 | | | | | |
| Synthetic resin G | | | | | | | | | | | |
| Synthetic resin H | | | | | | | | | | | |
| Synthetic resin K | | | | | | | | | | | |
| Colloidal SiO$_2$ | 6.1 | 6.1 | 6.1 | 6.1 | 6.1 | 6.1 | 6.1 | 6.1 | 6.1 | 6.1 | |
| Wax 1 | 2.0 | 2.0 | 2.0 | 2.0 | 2.0 | 2.0 | 2.0 | 2.0 | 2.0 | 2.0 | 2.0 |
| Wax 2 | 5.9 | 5.9 | 5.9 | 5.9 | 5.9 | 5.9 | 5.9 | 5.9 | 5.9 | 5.9 | 5.9 |
| Defoaming agent | 0.8 | 0.8 | 0.8 | 0.8 | 0.8 | 0.8 | 0.8 | 0.8 | 0.8 | 0.8 | 0.8 |
| Polysiloxane | 0.6 | 0.6 | 0.6 | 0.6 | 0.6 | 0.6 | 0.6 | 0.6 | 0.6 | 0.6 | 0.6 |
| Film-forming aid | 7.6 | 7.6 | 7.6 | 7.6 | 7.6 | 7.6 | 7.6 | 7.6 | 7.6 | 7.6 | 7.6 |
| Silane 1 | 0.4 | 0.4 | 0.4 | 0.4 | 0.4 | 0.4 | 0.4 | 0.4 | 0.4 | 0.4 | 0.4 |
| Inorganic crosslinker 5 | 1.5 | 1.5 | | | | 1.5 | 1.5 | | 1.5 | 0.7 | 1.5 |
| Inorganic crosslinker 6 | | | 1.5 | 1.5 | 1.5 | | | 1.5 | 1.5 | 0.7 | |
| Ammonium bichromate | | | | | | | | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 70 | 130 | 70 | 100 | 100 | 100 |
| Test results | | | | | | | | | | | |
| Dry film thickness, g/m$^2$ | 1.2 | 1.2 | 1.2 | 1.2 | 1.2 | 1.2 | 1.2 | 1.2 | 1.2 | 1.2 | 1.2 |
| Corrosion resistance | 2 | 3 | 1 | 2 | 3 | 1 | 1 | 1 | 1 | 1 | 1 |
| Resistance to mechanical influence | 2 | 3 | 1 | 2 | 3 | 1 | 1 | 1 | 1 | 1 | 1 |
| Blocking resistance | 2 | 3 | 1 | 2 | 3 | 1 | 1 | 1 | 1 | 1 | 1 |
| Outdoor weathering | 2 | 3 | 1 | 2 | 3 | 1 | 1 | 1 | 1 | 1 | 1 |
| Formability | 1 | 1 | 1 | 1 | 1 | 1 | 1 | 1 | 1 | 1 | 1 |

TABLE 1-continued

Compositions of the aqueous compositions applied to Galvalume ® and properties of the coatings produced therewith

| | | | | | | | | | | | |
|---|---|---|---|---|---|---|---|---|---|---|---|
| Resistance to acids and lyes | 2 | 3 | 1 | 2 | 3 | 2 | 1 | 1 | 1 | 1 | 1 |
| Yellowing resistance at elevated temperature (60 min at 200° C.) | 2 | 2 | 2 | 2 | 2 | 2 | 2 | 2 | 2 | 2 | 2 |
| Paintability | 3 | 4 | 1 | 3 | 4 | 1 | 1 | 1 | 1 | 1 | 1 |

| | Example | | | | | | | | | | |
|---|---|---|---|---|---|---|---|---|---|---|---|
| Content in g/l | E28 | E29 | E30 | E31 | E32 | CE7 | CE8 | CE9 | CE10 | CE11 | CE12 |
| Water | 896.0 | 896.0 | 896.0 | 896.0 | 896.0 | 896.0 | 896.0 | 896.0 | 896.0 | 896.0 | 896.0 |
| Synthetic resin A | | | | | | | | | | | |
| Synthetic resin B | | | | | | | | | | | |
| Synthetic resin C | | | | | | 29.2 | 32.0 | | | | |
| Synthetic resin D | | | | | | 26.4 | 29.0 | | | | |
| Synthetic resin E | 85.2 | 84.4 | 85.2 | 84.8 | | | | | | | |
| Synthetic resin F | | | | | 32.0 | | | 81.0 | 85.6 | 87.4 | 87.1 |
| Synthetic resin G | | | | | | 20.0 | 22.7 | | | | |
| Synthetic resin L | | | | | 24.5 | | | | | | |
| Synthetic resin M | | | | | 24.6 | | | | | | |
| Colloidal SiO$_2$ | | | | | 6.1 | 16.5 | | 6.1 | | 6.1 | 6.1 |
| Wax 1 | 2.0 | 2.0 | 2.0 | 2.0 | 5.9 | 5.9 | 5.9 | 5.9 | 5.9 | | 5.9 |
| Wax 2 | 5.9 | 5.9 | 5.9 | 5.9 | | | | | 2.0 | 2.0 | 2.0 |
| Defoaming agent | 0.8 | 0.8 | 0.8 | 0.8 | 0.8 | 0.8 | 0.8 | 0.8 | 0.8 | 0.8 | 0.8 |
| Polysiloxane | 0.6 | 0.6 | 0.6 | 0.6 | 0.6 | 0.6 | 0.6 | 0.6 | 0.6 | 0.6 | 0.6 |
| Film-forming aid | 7.6 | 7.6 | 7.6 | 7.6 | 7.6 | 2.7 | 2.7 | 7.6 | 7.6 | 7.6 | |
| Silane 1 | | | | 0.4 | 0.4 | 0.4 | | | | | |
| Silane 2 | 0.4 | 1.2 | | | | | | | | | |
| Silane 3 | | | 0.4 | 0.4 | | | | | | | |
| Inorganic crosslinker 5 | 1.5 | 1.5 | 1.5 | 1.5 | 1.5 | 1.5 | | | 1.5 | 1.5 | 1.5 |
| Ammonium bichromate | | | | | | | 10.3 | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 100 | 100 | 100 | 100 | 100 | 100 |
| Test results | | | | | | | | | | | |
| Dry film thickness, g/m$^2$ | 1.2 | 1.2 | 1.2 | 1.2 | 1.2 | 1.2 | 1.2 | 1.2 | 1.2 | 1.2 | 1.2 |
| Corrosion resistance | 2 | 1 | 2 | 2 | 3 | 5 | 1 | 5 | 3 | 4 | 3 |
| Resistance to mechanical influence | 1 | 1 | 1 | 1 | 4 | 5 | 1 | 2 | 1 | 3 | 1 |
| Blocking resistance | 1 | 1 | 1 | 1 | 4 | 4 | 3 | 1 | 1 | 1 | 1 |
| Outdoor weathering | 1 | 1 | 1 | 1 | 4 | 4 | 2 | 3 | 2 | 2 | 2 |
| Formability | 1 | 1 | 1 | 1 | 2 | 3 | 3 | 2 | 1 | 5 | 1 |
| Resistance to acids and lyes | 1 | 1 | 1 | 1 | 5 | 5 | 1 | 3 | 2 | 4 | 3 |
| Yellowing resistance at elevated temperature (60 min at 200° C.) | 2 | 2 | 2 | 2 | 3 | 2 | 2 | 2 | 2 | 2 | 2 |
| Paintability | 1 | 1 | 1 | 1 | 4 | 3 | 2 | 2 | 2 | 2 | 2 |

Results of the Tests on Galvalume® Sheets:

The aqueous compositions from Table 1 were able to be processed readily into polymeric coatings. The dried polymeric coatings each had a film thickness in the region of about 1.2 μm or about 1.7 μm. All coatings were transparent, colourless and had a light silk gloss so the optical character of the metallic surface could still be distinguished with virtually no change.

In examples E1 to E3 and in comparative examples CE1 to CE6 the synthetic resin used was varied, whilst the other additives, the drying temperature and the dry film thickness remained unchanged. Synthetic resins E and F proved to be by far the most suitable. In examples E4 to E7 synthetic resin mixtures were added under otherwise identical conditions. These examples did not produce the good coating results of examples E1 and E2, however. Example E8 is a repeat test of E2 and E14 is a repeat test of E1, in an additional series of tests in each case.

In examples E9 to E13 and E15 and E16 a second low-melting lubricant was additionally added, wherein the solids contents of the aqueous composition and the contents of crosslinker also increased in some cases and consequently the dry film thickness increased too. The addition of this lubricant led to a surprising, marked improvement in the polymeric coatings. The batchwise addition of an acrylate-containing synthetic resin produced somewhat less good results, however. In examples E17 to E22 the proportions of acrylate in the synthetic resin and the type of crosslinker were varied. In examples E23 to E31 synthetic resin E was added; the contents of inorganic particles or/and silane and the type of silane were varied. The result for yellowing resistance over 60 minutes at 200° C. is entirely sufficient for market requirements even if a very faint yellowing (mark 2) is discernible. In example 32 a mixture of synthetic resins with a notably different composition was used.

In comparative example CE7 a mixture of different components of the organic film former was used. In comparative example CE8 a chromium(VI) compound was added. In comparative examples CE12 to CE16 one of the substances required according to the invention was omitted, the aqueous composition of example E14 being used as a starting point.

For Galvalume® surfaces an addition of a zirconium-containing crosslinker also proved advantageous for corrosion protection.

The aqueous compositions listed in Table 1 and the properties of the polymeric coatings produced therewith are ideally suitable for hot-dip galvanised surfaces and for alloy hot-dip galvanised surfaces with a low aluminium content. They can be used extremely successfully for further processing, especially in the white goods industry, e.g. for refrigerators, optionally with subsequent decorative painting.

B) Coating of HDG Steel Sheets

Examples E41 to E60 According to the Invention and Comparative Examples CE21 to CE32

Steel sheets which were obtained from commercial cold-rolled and subsequently hot-dip galvanised steel strip and which were oiled during storage for the purposes of protection were first degreased in an alkaline spray cleaner, rinsed with water and dried at elevated temperature. The constituents of the aqueous composition were mixed together and the pH of the aqueous dispersion was then adjusted to 8.2 using an ammonia solution. The bath composition consisted of the aqueous composition according to Table 2. A defined amount of the aqueous composition was then applied using a roll coater in such a way that a wet film thickness of about 0.10 ml/m$^2$ was achieved. The wet film was then dried at temperatures of about 100° C. or about 150° C. PMT, made into a film and more or less cured. Heating was applied only during drying. Thus crosslinking took place substantially only during drying and subsequently as post-crosslinking. The steel sheets treated in this way were then tested for their corrosion protection, their mechanical properties and other properties. All tests were performed after a storage time of 24 h.

The properties determined on the polymeric coatings are rated in the tables under the test results with marks from 1 to 5, where 1 is very good and 5 is inadequate. In the case of hot-dip galvanized sheets the mark for corrosion protection is an average for results from the condensation climate test with constant humidity and air temperature, the condensation climate test with alternating humidity and air temperature and the wet pack test (condensation formation on passing through various climate zones).

TABLE 2

Composition of the aqueous compositions applied to HDG sheets and properties of the coatings produced therewith

| Content in g/l | CE21 | CE22 | CE23 | CE24 | CE25 | CE26 | CE27 | E41 | E42 | E43 | E44 |
|---|---|---|---|---|---|---|---|---|---|---|---|
| Water | 896.0 | 896.0 | 896.0 | 896.0 | 896.0 | 896.0 | 896.0 | 896.0 | 896.0 | 896.0 | 896.0 |
| Synthetic resin A | | 89.1 | | | | | 35.0 | | | | |
| Synthetic resin B | | | | | | | | | | | |
| Synthetic resin C | | | | | | | | | | | |
| Synthetic resin D | | | | | | | | | | | |
| Synthetic resin E | | | | | | | | | | | |
| Synthetic resin F | | | 89.1 | 83.0 | 76.9 | 70.8 | 41.9 | 68.7 | 68.7 | 68.7 | 68.7 |
| Synthetic resin G | | | | | | | | | | | |
| Synthetic resin H | | | | | | | | | | | |
| Synthetic resin K | 96.7 | | | | | | | | | | |
| Colloidal SiO2 | | | | 6.1 | 12.2 | 18.3 | 12.2 | 12.2 | 12.2 | 12.2 | 12.2 |
| Wax 1 | 5.9 | 5.9 | 5.9 | 5.9 | 5.9 | 5.9 | 5.9 | 5.9 | 5.9 | 5.9 | 5.9 |
| Wax 2 | | | | | | | | | | | |
| Defoaming agent | 0.8 | 0.8 | 0.8 | 0.8 | 0.8 | 0.8 | 0.8 | 0.8 | 0.8 | 0.8 | 0.8 |
| Polysiloxane | 0.6 | 0.6 | 0.6 | 0.6 | 0.6 | 0.6 | 0.6 | 0.6 | 0.6 | 0.6 | 0.6 |
| Film-forming aid | | 7.6 | 7.6 | 7.6 | 7.6 | 7.6 | 7.6 | 7.6 | 7.6 | 7.6 | 7.6 |
| Silane 1 | | | | | | | | | | | |
| Organic crosslinker 1 | | | | | | | | 8.2 | | | |
| Organic crosslinker 2 | | | | | | | | | 8.2 | | |
| Organic crosslinker 3 | | | | | | | | | | 8.2 | |
| Organic crosslinker 4 | | | | | | | | | | | 8.2 |
| Ammonium bichromate | | | | | | | | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 100 | 100 | 100 | 100 | 100 | 100 |
| Test results | | | | | | | | | | | |
| Dry film thickness, g/m$^2$ | 1.2 | 1.2 | 1.2 | 1.2 | 1.2 | 1.2 | 1.2 | 1.2 | 1.2 | 1.2 | 1.2 |
| Corrosion resistance | 2 | 5 | 3 | 3 | 2 | 2 | 3 | 3 | 3 | 3 | 3 |
| Resistance to mechanical influence | 2 | 5 | 2 | 2 | 2 | 2 | 2 | 2 | 2 | 2 | 2 |
| Blocking resistance | 5 | 4 | 1 | 1 | 1 | 1 | 1 | 1 | 1 | 1 | 1 |
| Formability | 2 | 2 | 2 | 2 | 2 | 2 | 2 | 2 | 2 | 2 | 2 |
| Resistance to acids and lyes | 5 | 5 | 5 | 5 | 5 | 5 | 5 | 3 | 1 | 5 | 5 |
| Yellowing resistance at elevated temperature (60 min at 200° C.) | 5 | 2 | 2 | 2 | 2 | 2 | 2 | 2 | 2 | 2 | 2 |
| Paintability | 2 | 4 | 1 | 1 | 1 | 1 | 3 | 1 | 1 | 1 | 1 |

| Content in g/l | CE28 | CE29 | CE30 | CE31 | CE32 | E45 | E46 | E47 | E48 | E49 | E50 |
|---|---|---|---|---|---|---|---|---|---|---|---|
| Water | 896.0 | 896.0 | 896.0 | 896.0 | 896.0 | 896.0 | 896.0 | 896.0 | 896.0 | 844.0 | 844.0 |
| Synthetic resin A | | | | | | | | | | | |
| Synthetic resin B | 24.0 | | 26.9 | | | | | | | | |
| Synthetic resin C | 28.0 | | 30.9 | | | | | | | | |

TABLE 2-continued

Composition of the aqueous compositions applied to HDG sheets
and properties of the coatings produced therewith

| | | | | | | | | | | | |
|---|---|---|---|---|---|---|---|---|---|---|---|
| Synthetic resin D | 26.8 | | 31.0 | | | | | | | | |
| Synthetic resin E | | | | | | | | | | | |
| Synthetic resin F | | 78.8 | | 88.8 | 82.3 | 74.1 | 74.1 | 74.1 | 74.1 | 126.1 | 126.1 |
| Synthetic resin G | | | | | | | | | | | |
| Synthetic resin H | | | | | | | | | | | |
| Synthetic resin K | | | | | | | | | | | |
| Colloidal SiO2 | | | | | 6.1 | 6.1 | 6.1 | 6.1 | 6.1 | 6.1 | 6.1 |
| Wax 1 | 5.9 | 5.9 | 5.9 | 5.9 | 5.9 | 5.9 | 5.9 | 5.9 | 5.9 | 5.9 | 5.9 |
| Wax 2 | | | | | | | | | | | |
| Defoaming agent | 0.8 | 0.8 | 0.8 | 0.8 | 0.8 | 0.8 | 0.8 | 0.8 | 0.8 | 0.8 | 0.8 |
| Polysiloxane | 0.6 | 0.6 | 0.9 | 0.9 | 0.9 | 0.9 | 0.9 | 0.9 | 0.9 | 0.9 | 0.9 |
| Film-forming aid | 7.6 | 7.6 | 7.6 | 7.6 | 7.6 | 7.6 | 7.6 | 7.6 | 7.6 | 7.6 | 7.6 |
| Silane 1 | | | | | 0.4 | 0.4 | 0.4 | 0.4 | 0.4 | 0.4 | 0.4 |
| Organic crosslinker 1 | | | | | | 8.2 | | | | 8.2 | |
| Organic crosslinker 2 | | | | | | | 8.2 | | | | 8.2 |
| Organic crosslinker 3 | | | | | | | | 8.2 | | | |
| Organic crosslinker 4 | | | | | | | | | 8.2 | | |
| Ammonium bichromate | 10.3 | 10.3 | | | | | | | | | |
| Total | 1000.0 | 1000.0 | 1000.0 | 1000.0 | 1000.0 | 1000.0 | 1000.0 | 1000.0 | 1000.0 | 1000.0 | 1000.0 |
| Drying, ° C. PMT | 100 | 100 | 100 | 100 | 100 | 100 | 100 | 100 | 100 | 150 | 150 |

Test results

| | | | | | | | | | | | |
|---|---|---|---|---|---|---|---|---|---|---|---|
| Dry film thickness, g/m² | 1.2 | 1.2 | 1.2 | 1.2 | 1.2 | 1.2 | 1.2 | 1.2 | 1.2 | 1.2 | 1.2 |
| Corrosion resistance | 1 | 1 | 5 | 5 | 4 | 3 | 3 | 3 | 3 | 3 | 3 |
| Resistance to mechanical influence | 3 | 1 | 1 | 1 | 2 | 1 | 1 | 3 | 3 | 1 | 1 |
| Blocking resistance | 3 | 1 | 1 | 1 | 2 | 1 | 1 | 1 | 1 | 1 | 1 |
| Formability | 2 | 2 | 2 | 2 | 2 | 2 | 2 | 3 | 3 | 2 | 2 |
| Resistance to acids and lyes | 2 | 2 | 2 | 2 | 5 | 1 | 1 | 4 | 4 | 1 | 1 |
| Yellowing resistance at elevated temperature (60 min at 200° C.) | 2 | 2 | 2 | 2 | 2 | 2 | 2 | 2 | 2 | 2 | 2 |
| Paintability | 1 | 1 | 5 | 1 | 2 | 1 | 1 | 3 | 3 | 1 | 1 |

| | Example | | | | | | | | | |
|---|---|---|---|---|---|---|---|---|---|---|
| Content in g/l | E51 | E52 | E53 | E54 | E55 | E56 | E57 | E58 | E59 | E60 |
| Water | 896.0 | 896.0 | 896.0 | 896.0 | 896.0 | 896.0 | 896.0 | 896.0 | 896.0 | 896.0 |
| Synthetic resin A | | | | | | | | | | |
| Synthetic resin B | | | | | | | | | | |
| Synthetic resin C | | | | | | | | | | |
| Synthetic resin D | | | | | | | | | | |
| Synthetic resin E | | | | | | | | | | |
| Synthetic resin F | 74.1 | 74.1 | 74.1 | 74.1 | 74.1 | 74.1 | 70.0 | 70.0 | 70.0 | 70.0 |
| Synthetic resin G | | | | | | | | | | |
| Synthetic resin H | | | | | | | | | | |
| Synthetic resin K | | | | | | | | | | |
| Colloidal SiO₂ | 6.1 | 6.1 | 6.1 | 6.1 | 6.1 | 6.1 | 6.1 | 6.1 | 6.1 | 6.1 |
| Wax 1 | 5.9 | 5.9 | 1.9 | 1.9 | 1.9 | 1.9 | 1.9 | 1.9 | 1.9 | 1.9 |
| Wax 2 | | | 4.0 | 4.0 | 4.0 | 4.0 | 4.0 | 4.0 | 4.0 | 4.0 |
| Defoaming agent | 0.8 | 0.8 | 0.8 | 0.8 | 0.8 | 0.8 | 0.8 | 0.8 | 0.8 | 0.8 |
| Polysiloxane | 0.9 | 0.9 | 0.9 | 0.9 | 0.9 | 0.9 | 0.9 | 0.9 | 0.9 | 0.9 |
| Film-forming aid | 7.6 | 7.6 | 7.6 | 7.6 | 7.6 | 7.6 | 7.6 | 7.6 | 7.6 | 7.6 |
| Silane 1 | 0.4 | 0.4 | 0.4 | 0.4 | 0.4 | 0.4 | 0.4 | 0.4 | 0.4 | 0.4 |
| Organic crosslinker 1 | | | 8.2 | | | | 4.1 | | | |
| Organic crosslinker 2 | | | | 8.2 | | | | 4.1 | | |
| Organic crosslinker 3 | 8.2 | | | | 8.2 | | | | 4.1 | |
| Organic crosslinker 4 | | 8.2 | | | | 8.2 | | | | 4.1 |
| Organic corrosion inhibitor | | | | | | | 8.2 | 8.2 | 8.2 | 8.2 |
| Total | 1000.0 | 1000.0 | 1000.0 | 1000.0 | 1000.0 | 1000.0 | 1000.0 | 1000.0 | 1000.0 | 1000.0 |
| Drying, ° C. PMT | 150 | 150 | 100 | 100 | 150 | 150 | 100 | 100 | 150 | 150 |

Test results

| | | | | | | | | | | |
|---|---|---|---|---|---|---|---|---|---|---|
| Dry film thickness, g/m² | 1.2 | 1.2 | 1.2 | 1.2 | 1.2 | 1.2 | 1.2 | 1.2 | 1.2 | 1.2 |
| Corrosion resistance | 2 | 2 | 2 | 2 | 2 | 2 | 1 | 1 | 1 | 1 |
| Resistance to mechanical influence | 1 | 1 | 1 | 1 | 1 | 1 | 1 | 1 | 1 | 1 |
| Blocking resistance | 1 | 1 | 1 | 1 | 1 | 1 | 1 | 1 | 1 | 1 |
| Formability | 1 | 1 | 1 | 1 | 1 | 1 | 1 | 1 | 1 | 1 |
| Resistance to acids and lyes | 1 | 1 | 1 | 1 | 1 | 1 | 1 | 1 | 1 | 1 |
| Yellowing resistance at elevated temperature (60 min at 200° C.) | 2 | 2 | 2 | 2 | 2 | 2 | 2 | 2 | 2 | 2 |
| Paintability | 1 | 1 | 1 | 1 | 1 | 1 | 1 | 1 | 1 | 1 |

Results of the Tests on HDG Sheets:

The aqueous compositions from Table 2 were able to be processed readily into polymeric coatings. The dried polymeric coatings had a film thickness in the region of about 1.2 μm. All coatings were transparent, colourless and had a light silk gloss so the optical character of the metallic surface could still be distinguished with virtually no change.

In comparative examples CE21 to CE27 no crosslinker, no silane and in some cases no inorganic particles were added to the aqueous composition. The synthetic resin of the organic film former was varied in some cases. In comparative example CE21 the film-forming aid was also omitted, which led to an even poorer blocking resistance, chemical resistance and yellowing resistance. By reason of the addition of an ionomer, the organic film former was the only one of the organic film formers described or/and tested that was capable of forming a film even without a film-forming aid. In comparative examples CE23 to CE26 with the preferred synthetic resin F an addition of inorganic particles brought about a further clear improvement in the corrosion protection.

Comparative examples CE28 to CE31 illustrated the effect of a chromium(VI) addition on the corrosion protection of crosslinker-free aqueous compositions, the chromium(VI) addition also having a crosslinking effect on the synthetic resins. In comparative example CE32 the influence of the missing crosslinker was discernible above all in the corrosion resistance and chemical resistance.

Examples E45 to E61 according to the invention were performed in four series using four different crosslinkers, wherein in the first series from E45 to E48 the drying temperature was kept constant at 100° C., wherein in the second series from E49 to E52 the drying temperature was kept constant at 150° C., wherein in the third series from E53 to E56 the drying temperature was adjusted to the individual crosslinker and a second, low-melting lubricant was additionally added, and wherein in the fourth series from E57 to E60 —starting from the third series—a titanium-containing corrosion inhibitor was additionally added, which brought about a further marked improvement in the corrosion resistance. In contrast to examples E45 and E46, in examples E47 and E48 the coated sheets were not dried and heated at sufficiently high temperatures for the added organic crosslinkers in order to achieve the high temperatures necessary for organic crosslinkers 3 and 4 respectively. Owing to the inadequate crosslinking of the polymeric coating, the acid and lye resistance is inadequate. If the coated sheets in examples E45 and E46 had been dried at or/and heated to higher temperatures, this defect would have been prevented. Conversely, examples E49 to E52 show that an elevated drying temperature, which in some cases is above the optimum crosslinking temperature, does no harm. Overall, the successive improvement in all properties of the coatings, with the exception of the yellowing resistance, from the first series to the fourth series is clear. The result for yellowing resistance over 60 minutes at 200° C. is however entirely sufficient for market requirements even if a very faint yellowing (mark 2) is discernible.

The invention claimed is:

1. A process comprising coating a metallic surface with an aqueous composition to form a coated metal part, wherein the aqueous composition comprises:
   a) an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
   b) at least one 4 to 16 carbon long-chain alcohol as film-forming aid for the organic film former selected from the group consisting of a butanediol, an ethylene glycol ether and a polypropylene glycol ether;
   c) at least one inorganic crosslinker based on a member selected from the group consisting of titanium, hafnium and zirconium;
   d) from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
   e) A) at least one silane, silanol or siloxane or B) at least one inorganic compound in particle form with an average particle diameter measured on a scanning electron microscope in the range from 0.005 to 0.3 μm; and
   g) water;
   wherein the metallic surface is brought into contact with the aqueous composition and a substantially organic film is formed on the metallic surface, which is then dried and optionally also cured; and
   wherein the dried and optionally also cured film has a film thickness in the range from 0.01 to 10 μm, determined by detaching a defined area of the cured film and weighing it, wherein a ratio of the wax to the organic film former is from 0.02:1 to 2:1.

2. The process according to claim 1, wherein the organic film former includes a content of synthetic resin in the form of at least one polymer, copolymer, block copolymer or graft copolymer based on polycarbonate in the range from 10 to 70 wt. % of the total content of organic film former.

3. The process according to claim 1, wherein the organic film former includes a content of synthetic resin in the form of at least one polymer, copolymer, block copolymer or graft copolymer based on polyurethane in the range from 10 to 70 wt. % of the total content of organic film former.

4. The process according to claim 1, wherein the organic film former includes a content of synthetic resin in the form of at least one polymer, copolymer, block copolymer or graft copolymer based on polyester in the range from 1 to 40 wt. % of the total content of organic film former.

5. The process according to claim 1, wherein the pH of the organic film former in an aqueous composition is in the range from 6.5 to 11.

6. The process according to claim 1, wherein the aqueous composition includes a content of 2 to 600 g/l of organic film former based on solids.

7. The process according to claim 1, wherein the at least one long-chain alcohol is present in an amount of from 0.01 to 50 g/l based on solids.

8. The process according to claim 7, wherein the at least one long-chain alcohol has 4 carbon atoms.

9. The process according to claim 1, wherein a largely or wholly homogeneous organic film is formed by film forming from the organic film former together with at least one film-forming aid, during or after the removal of water.

10. The process according to claim 1, wherein at least one non-hydrolysed, partially hydrolysed or completely hydrolysed silane or at least one corresponding silanol or siloxane is added to the aqueous composition.

11. The process according to claim 1, wherein the aqueous composition contains at least one partially hydrolysed or completely hydrolysed silane or at least one corresponding silanol or siloxane.

12. The process according to claim 1, wherein at least one acyloxysilane, alkylsilane, aminosilane, bis-silyl silane, epoxysilane, fluoroalkyl silane, isocyanato silane, mercapto silane, (meth)acrylatosilane, monosilyl silane, polysilyl silane, ureidosilane, vinyl silane or at least one corresponding silanol or siloxane is included.

13. The process according to claim 1, wherein a content of at least one silane, silanol or siloxane calculated as silane in the range from 0.1 to 50 g/l based on solids is added to the aqueous composition.

14. The process according to claim 1, wherein the inorganic compound in particle form is added to the aqueous composition in the form of a finely divided powder, a dispersion or a suspension.

15. The process according to claim 1, wherein the aqueous composition contains 0.1 to 500 g/l of the at least one inorganic compound in particle form based on solids.

16. The process according to claim 1, wherein the aqueous composition contains at least one organic corrosion inhibitor based on amine, alkanolamine, alkyl aminoethanol, succinic acid derivative, conductive polymer or thiol.

17. The process according to claim 1, wherein at least one of the synthetic resins used is radiation curable and that in addition at least one photoinitiator is added to allow crosslinking by irradiation with actinic radiation.

18. The process according to claim 17, wherein the coating is cured partially by drying and film forming and partially by actinic radiation and optionally by thermal crosslinking.

19. The process according to claim 1, wherein the aqueous composition optionally contains at least one each of a biocide, a defoaming agent, a wetting agent or a paint additive.

20. The process according to claim 1, wherein the aqueous composition further comprises at least one chromate based on $Cr^{3+}$.

21. The process according to claim 1, wherein the aqueous composition has a pH in the range from 6.5 to 11.

22. The process according to claim 1, wherein the aqueous composition has a temperature in the range from 5 to 50° C. when applied to the metallic surface.

23. The process according to claim 1, wherein during application of the coating the metallic surface is kept at temperatures in the range from 5 to 120° C.

24. The process according to claim 1, wherein the coated metallic surface is dried at a temperature in the range from 20 to 400° C. peak metal temperature.

25. The process according to claim 1, wherein the aqueous composition is applied by roller coating, flow coating, blade coating, spattering, spraying, brushing or dipping and optionally by subsequent squeegeeing with a roller.

26. The process according to claim 1, wherein the metallic surface comprises at least one metal selected from the group consisting of aluminum, iron, copper, magnesium, nickel, titanium, tin, zinc and alloys thereof.

27. The process according to claim 1, wherein at least one coating consisting of lacquer, based on organic polymer, paint, adhesive or adhesive support is applied to the dried and optionally also cured film.

28. The process according to claim 1, wherein the coated metal part is formed, painted, coated with polymers printed, glued, hot-soldered, welded or connected to an element.

29. The process of claim 1, wherein the content of the at least one inorganic crosslinker is in the range from 0.01 to 50 g/l based on solids is added to the aqueous composition.

30. The process according to claim 1, wherein the aqueous composition further comprises member selected from the group consisting of an organic corrosion inhibitor, an organic solvent and an additive.

31. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
   at least one 4 to 16 carbon long-chain alcohol as film-forming aid for the organic film former selected from the group consisting of a butanediol, an ethylene glycol ether and a polypropylene glycol ether;
   a crosslinker based on a member selected from the group consisting of an azo compound, diamine, diimide, formaldehyde, imidazole, isocyanate, isocyanurate, melamine, peroxide, triazine and triazole;
   from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
   A) at least one silane, silanol or siloxane or B) at least one inorganic compound in particle form with an average particle diameter measured on a scanning electron microscope in the range from 0.005 to 0.3 µm; and water;
   wherein the metallic surface is brought into contact with the aqueous composition and a substantially organic film is formed on the metallic surface, which is then dried and optionally cured; and
   wherein the dried and optionally also cured film has a film thickness in the range from 0.01 to 10 µm, determined by detaching a defined area of the cured film and weighing it, wherein a ratio of the wax to the organic film former is from 0.02:1 to 2:1.

32. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
   a 4 to 16 carbon long-chain alcohol as film-forming aid for the organic film former selected from the group consisting of a butanediol, an ethylene glycol ether and a polypropylene glycol ether;
an inorganic crosslinker;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 µm;
water;
wherein the metallic surface is brought into contact with the aqueous composition and a substantially organic film is formed on the metallic surface, which is then dried and optionally also cured; and
wherein the dried and optionally also cured film has a film thickness in the range from 0.01 to 10 µm, determined by detaching a defined area of the cured film and weighing it, wherein a ratio of the wax to the organic film former is from 0.02:1 to 2:1, wherein the inorganic crosslinker is selected from the group consisting of a boron-containing compound and a basic compound.

33. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
a 4 to 16 carbon long-chain alcohol as film-forming aid for the organic film former selected from the group consisting of a butanediol, an ethylene glycol ether and a polypropylene glycol ether;
an inorganic crosslinker;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 µm;
water;
wherein the metallic surface is brought into contact with the aqueous composition and a substantially organic film is formed on the metallic surface, which is then dried and optionally also cured; and
wherein the dried and optionally also cured film has a film thickness in the range from 0.01 to 10 µm, determined by detaching a defined area of the cured film and weighing it, wherein a ratio of the wax to the organic film former is from 0.02:1 to 2:1, wherein the inorganic crosslinker is a basic compound selected from the group consisting of titanium, hafnium, ammonium and zirconium.

34. The process according to claim 33, wherein the at least one inorganic cross-linker is a carbonate.

35. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether or polystyrene, wherein the content of polycarbonate and polyurethane is at least 10 wt. % each and the content of polycarbonate and polyurethane together in the organic film former is at least 50 wt. %;
at least one 4 to 16 carbon long-chain alcohol as film-forming aid for the organic film former selected from the group consisting of a butanediol, an ethylene glycol ether and a polypropylene glycol ether;
at least one inorganic crosslinker based on a member selected from the group consisting of titanium, hafnium and zirconium;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 µm; and
water;
wherein the metallic surface is brought into contact with the aqueous composition and a substantially organic film is formed on the metallic surface, which is then dried; and
wherein the dried film has a film thickness in the range from 0.01 to 10 µm, determined by detaching a defined area of the cured film and weighing it,
wherein a ratio of wax to the organic film former is from 0.02:1 to 2:1.

36. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether or polystyrene, wherein the content of polycarbonate and polyurethane is at least 10 wt. % each and the content of polycarbonate and polyurethane together in the organic film former is at least 50 wt. %;
at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and cured; and wherein the dried and cured film has a film thickness in the range from 0.01 to 10 μm, determined by detaching a defined area of the cured film and weighing it, wherein a ratio of wax to the organic film former is from 0.02:1 to 2:1.

37. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and optionally also cured; and wherein the dried and optionally also cured film has a film thickness in the range from 0.01 to 10 μm, determined by detaching a defined area of the cured film and weighing it, wherein a ratio of wax to the organic film former is from 0.02:1 to 2:1, and wherein the organic film former is based on a member selected from the group consisting of epoxide, urea-formaldehyde, melamine-formaldehyde, (meth)acrylate, phenol, polyacrylic acid, polyether, polyethylene, polyethylenimine, polystyrene, polyvinyl and polyvinyl phenol.

38. The process according to claim 37, wherein the aqueous composition further comprises member selected from the group consisting of an organic corrosion inhibitor, an organic solvent and an additive.

39. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and optionally also cured; and wherein the dried and optionally also cured film has a film thickness in the range from 0.01 to 10 μm, determined by detaching a defined area of the cured film and weighing it, wherein a ratio of the wax to the organic film former is from 0.02:1 to 2:1, wherein the synthetic resin comprises a polymer, copolymer, block copolymer or graft copolymer based on a member selected from the group consisting of (meth)acrylate, ethylene (meth)acrylate or styrene (meth)acrylate.

40. The process according to claim 39, wherein the aqueous composition further comprises member selected from the group consisting of an organic corrosion inhibitor, an organic solvent and an additive.

41. A process comprising coating a metallic surface with an aqueous composition to form a coated metal part, wherein the aqueous composition comprises:

an organic film former comprising at least one synthetic resin, wherein 70 to 100 wt. % of the content of synthetic resin blend in the organic film former comprises at least one water-soluble or water-dispersible synthetic resin in a content in the range of from 30 to 150 g/L selected from the group consisting of a polymer, copolymer, block polymer and graft polymer;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 µm; and water;

wherein the metallic surface is brought into contact with the aqueous composition and a substantially organic film is formed on the metallic surface, which is then dried and optionally also cured; and wherein the dried and optionally also cured film has a film thickness in the range from 0.01 to 10 µm, determined by detaching a defined area of the cured film and weighing it, wherein a ratio of the wax to the organic film former is from 0.02:1 to 2:1, wherein organic film former contains a synthetic resin blend, wherein the synthetic resin blend is based on a member selected from the group consisting of epoxide, urea-formaldehyde, melamine-formaldehyde, (meth)acrylate, phenol, polyacrylic acid, polyether, polyethylene, polyethylenimine, polystyrene, polyvinyl and polyvinyl phenol.

42. The process according to claim 41, wherein the aqueous composition further comprises member selected from the group consisting of an organic corrosion inhibitor, an organic solvent and an additive.

43. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 µm;

f) at least one organic corrosion inhibitor, at least one organic solvent or at least one additive; and g) water;

wherein the metallic surface is brought into contact with the aqueous composition and a substantially organic film is formed on the metallic surface, which is then dried and optionally also cured; and wherein the dried and optionally also cured film has a film thickness in the range from 0.01 to 10 µm, determined by detaching a defined area of the cured film and weighing it, wherein a ratio of the wax to the organic film former is from 0.02:1 to 2:1.

44. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one crosslinker which is based on a member selected from the group consisting of titanium, hafnium, zirconium, aziridine, an azo compound, diamine, diimide, formaldehyde, imidazole, isocyanate, isocyanurate, melamine, peroxide, triazine and triazole;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 µm;

f) optionally at least one organic corrosion inhibitor, at least one organic solvent or at least one additive; and g) water;

wherein the metallic surface is brought into contact with the aqueous composition and a substantially organic film is formed on the metallic surface, which is then dried and optionally also cured; and wherein the dried and optionally also cured film has a film thickness in the range from 0.01 to 10 µm, determined by detaching a defined area of the cured film and weighing it, wherein a ratio of the wax to the organic film former is from 0.02:1 to 2:1.

45. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
at least one 4 to 16 carbon long-chain alcohol as film-forming aid for the organic film former selected from the group consisting of a butanediol, an ethylene glycol ether and a polypropylene glycol ether;
at least one crosslinker is selected from the group consisting of a polycarbodiimine, a trifunctional polyaziridine, triazine and an alkoxyalkyl melamine;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 μm;
f) optionally at least one organic corrosion inhibitor, at least one organic solvent or at least one additive; and
g) water;
wherein the metallic surface is brought into contact with the aqueous composition and a substantially organic film is formed on the metallic surface, which is then dried and optionally also cured; and
wherein the dried and optionally also cured film has a film thickness in the range from 0.01 to 10 μm, determined by detaching a defined area of the cured film and weighing it, wherein a ratio of wax to the organic film former is from 0.02:1 to 2:1.

46. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
at least one 4 to 16 carbon long-chain alcohol as film-forming aid for the organic film former selected from the group consisting of a butanediol, an ethylene glycol ether and a polypropylene glycol ether;
at least one crosslinker is selected from the group consisting of a titanium compound, a zirconium compound, a hafnium compound, a polycarbodiimine, a trifunctional polyaziridine, triazine and an alkoxyalkyl melamine;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 μm;
f) optionally at least one organic corrosion inhibitor, at least one organic solvent or at least one additive; and
g) water;
wherein the metallic surface is brought into contact with the aqueous composition and a substantially organic film is formed on the metallic surface, which is then dried and optionally also cured; and
wherein the dried and optionally also cured film has a film thickness in the range from 0.01 to 10 μm, determined by detaching a defined area of the cured film and weighing it, wherein a ratio of wax to the organic film former is from 0.02:1 to 2:1.

47. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 to 150 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
at least one 4 to 16 carbon long-chain alcohol as film-forming aid for the organic film former selected from the group consisting of a butanediol, an ethylene glycol ether and a polypropylene glycol ether;
a crosslinker based on a member selected from the group consisting of titanium, a hafnium, a zirconium, aziridine, an azo compound, diamine, diimide, formaldehyde, imidazole, isocyanate, isocyanurate, melamine, peroxide, triazine and triazole;
from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
A) at least one silane, silanol or siloxane or B) at least one inorganic compound in particle form with an average particle diameter measured on a scanning electron microscope in the range from 0.005 to 0.3 μm; and water;
wherein the metallic surface is brought into contact with the aqueous composition and a substantially organic film is formed on the metallic surface, which is then dried; and
wherein a ratio of the wax to the organic film former is from 0.02:1 to 2:1.

48. A process comprising coating a metallic surface with an aqueous composition to form a coated metal part, wherein the aqueous composition comprises:
an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

a crosslinker based on a member selected from the group consisting of titanium, hafnium, zirconium, diamine, diimide, formaldehyde, imidazole, isocyanate, isocyanurate, melamine, peroxide, triazine and triazole;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and cured; and wherein the dried and optionally also cured film has a film thickness in the range from 0.01 to 10 μm, determined by detaching a defined area of the cured film and weighing it, wherein a ratio of the wax to the organic film former is from 0.02:1 to 2:1.

49. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a copolymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and optionally cured; and wherein the dried and optionally also cured film has a film thickness in the range from 0.01 to 10 μm, determined by detaching a defined area of the cured film and weighing it, and wherein a ratio of the wax to the organic film former is from 0.02:1 to 2:1.

50. The process according to claim 49, wherein the organic film former includes a content of synthetic resin in the form of at least one polymer, copolymer, block copolymer or graft copolymer based on polycarbonate in the range from 10 to 70 wt. % of the total content of organic film former.

51. The process according to claim 49, wherein the organic film former includes a content of synthetic resin in the form of at least one polymer, copolymer, block copolymer or graft copolymer based on polyurethane in the range from 10 to 70 wt. % of the total content of organic film former.

52. The process according to claim 49, wherein the pH of the organic film former in an aqueous composition is in the range from 6.5 to 11.

53. The process according to claim 49, wherein the aqueous composition includes a content of 2 to 600 g/l of organic film former based on solids.

54. The process according to claim 49, wherein the at least one long-chain alcohol has 4 carbon atoms.

55. The process according to claim 49, wherein at least one non-hydrolysed, partially hydrolysed or completely hydrolysed silane or at least one corresponding silanol or siloxane is added to the aqueous composition.

56. The process according to claim 49, wherein the aqueous composition contains at least one partially hydrolysed or completely hydrolysed silane or at least one corresponding silanol or siloxane.

57. The process according to claim 49, wherein at least one acyloxysilane, alkylsilane, aminosilane, bis-silyl silane, epoxysilane, fluoroalkyl silane, isocyanato silane, mercapto silane, (meth)acrylatosilane, monosilyl silane, polysilyl silane, ureidosilane, vinyl silane or at least one corresponding silanol or siloxane is included.

58. The process according to claim 49, wherein a content of at least one silane, silanol or siloxane calculated as silane in the range from 0.1 to 50 g/l based on solids is added to the aqueous composition.

59. The process according to claim 49, wherein the aqueous composition contains at least one organic corrosion inhibitor based on amine, alkanolamine, alkyl aminoethanol, succinic acid derivative, conductive polymer or thiol.

60. The process according to claim 49, wherein at least one of the synthetic resins used is radiation curable and that in addition at least one photoinitiator is added to allow crosslinking by irradiation with actinic radiation.

61. The process according to claim 60, wherein the coating is cured partially by drying and film forming and partially by actinic radiation and optionally by thermal crosslinking.

62. The process according to claim 49, wherein the aqueous composition further comprises a member selected from the group consisting of a biocide, a defoaming agent, a wetting agent or a paint additive.

63. The process according to claim 49, wherein the aqueous composition further comprises at least one chromate based on $Cr^{3+}$.

64. The process according to claim 49, wherein the metallic surface comprises at least one metal selected from the group consisting of aluminum, iron, copper, magnesium, nickel, titanium, tin, zinc and alloys thereof.

65. A process comprising coating a metallic surface with an aqueous composition to form a coated metal part, wherein the aqueous composition comprises:
- an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyether and polystyrene, wherein the content of polycarbonate and polyurethane is at least 10 wt. % each and the content of polycarbonate and polyurethane together in the organic film former is at least 50 wt. %;
- at least one 4 to 16 carbon long-chain alcohol as film-forming aid for the organic film former selected from the group consisting of a butanediol, an ethylene glycol ether and a polypropylene glycol ether;
- a crosslinker based on a member selected from the group consisting of an azo compound, diamine, diimide, formaldehyde, imidazole, isocyanate, isocyanurate, melamine, peroxide, triazine and triazole;
- from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
- A) at least one silane, silanol or siloxane or B) at least one inorganic compound in particle form with an average particle diameter measured on a scanning electron microscope in the range from 0.005 to 0.3 µm; and
- water;
- wherein the metallic surface is brought into contact with the aqueous composition and a substantially organic film is formed on the metallic surface, which is then dried and optionally also cured; and
- wherein the dried and optionally also cured film has a film thickness in the range from 0.01 to 10 µm, determined by detaching a defined area of the cured film and weighing it, wherein a ratio of the wax to the organic film former is from 0.02:1 to 2:1.

66. A process comprising coating a metallic surface with an aqueous composition to form a coated metal part, wherein the aqueous composition comprises:
- an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
- a 4 to 16 carbon long-chain alcohol as film-forming aid for the organic film former selected from the group consisting of an ethylene glycol ether and a polypropylene glycol ether;
- an inorganic crosslinker;
- from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
- A) at least one silane, silanol or siloxane or B) at least one inorganic compound in particle form with an average particle diameter measured on a scanning electron microscope in the range from 0.005 to 0.3 µm;
- water;
- wherein the metallic surface is brought into contact with the aqueous composition and a substantially organic film is formed on the metallic surface, which is then dried and optionally also cured; and
- wherein the dried and optionally also cured film has a film thickness in the range from 0.01 to 10 µm, determined by detaching a defined area of the cured film and weighing it, wherein a ratio of the wax to the organic film former is from 0.02:1 to 2:1, wherein the inorganic crosslinker is a boron-containing compound.

67. A process comprising coating a metallic surface with an aqueous composition to form a coated metal part, wherein the aqueous composition comprises:
- an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
- a 4 to 16 carbon long-chain alcohol as film-forming aid for the organic film former selected from the group consisting of a butanediol, an ethylene glycol ether and a polypropylene glycol ether;
- an inorganic crosslinker;
- from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
- A) at least one silane, silanol or siloxane or B) at least one inorganic compound in particle form with an average particle diameter measured on a scanning electron microscope in the range from 0.005 to 0.3 µm;
- water;
- wherein the metallic surface is brought into contact with the aqueous composition and a substantially organic film is formed on the metallic surface, which is then dried and optionally also cured; and
- wherein the dried and optionally also cured film has a film thickness in the range from 0.01 to 10 µm, determined by detaching a defined area of the cured film and weighing it, wherein a ratio of the wax to the organic film former is from 0.02:1 to 2:1, wherein the inorganic crosslinker is a basic compound selected from the group consisting of titanium, ammonium and zirconium.

68. The process according to claim 67, wherein the at least one inorganic cross-linker is a carbonate.

69. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
   at least one 4 to 16 carbon long-chain alcohol as film-forming aid for the organic film former selected from the group consisting of a butanediol, an ethylene glycol ether and a polypropylene glycol ether;
   at least one inorganic crosslinker based on a member selected from the group consisting of titanium, hafnium and zirconium;
   from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
   A) at least one silane or B) at least one inorganic compound in particle form with an average particle diameter measured on a scanning electron microscope in the range from 0.005 to 0.3 μm; and
   water;
   wherein the metallic surface is brought into contact with the aqueous composition and a substantially organic film is formed on the metallic surface, which is then dried; and
   wherein the dried film has a film thickness in the range from 0.01 to 10 μm, determined by detaching a defined area of the cured film and weighing it,
   wherein a ratio of wax to the organic film former is from 0.02:1 to 2:1.

70. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;
   butanediol;
   at least one inorganic crosslinker based on a member selected from the group consisting of titanium, hafnium and zirconium;
   from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
   A) at least one silane, silanol or siloxane or B) at least one inorganic compound in particle form with an average particle diameter measured on a scanning electron microscope in the range from 0.005 to 0.3 μm; and
   water;
   wherein the metallic surface is brought into contact with the aqueous composition and a substantially organic film is formed on the metallic surface, which is then dried and cured; and
   wherein the dried and cured film has a film thickness in the range from 0.01 to 10 μm, determined by detaching a defined area of the cured film and weighing it,
   wherein a ratio of wax to the organic film former is from 0.02:1 to 2:1.

71. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer;
   at least one 4 to 16 carbon long-chain alcohol as film-forming aid for the organic film former selected from the group consisting of a butanediol, an ethylene glycol ether and a polypropylene glycol ether;
   at least one inorganic crosslinker based on titanium;
   from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;
   A) at least one silane, silanol or siloxane or B) at least one inorganic compound in particle form with an average particle diameter measured on a scanning electron microscope in the range from 0.005 to 0.3 μm; and
   water;
   wherein the metallic surface is brought into contact with the aqueous composition and a substantially organic film is formed on the metallic surface, which is then dried and cured; and
   wherein the dried and optionally also cured film has a film thickness in the range from 0.01 to 10 μm, determined by detaching a defined area of the cured film and weighing it, wherein a ratio of wax to the organic film former is from 0.02:1 to 2:1, wherein the synthetic resin is based on a member selected from the group consisting of epoxide, urea-formaldehyde, melamine-formaldehyde, (meth)acrylate, polyacrylic acid, polyether, polyethylene, polyethylenimine, polystyrene, polyvinyl and polyvinyl phenol.

72. A process comprising coating a metallic surface with an aqueous composition to form a coated metal part, wherein the aqueous composition comprises:
   an organic film former comprising at least one synthetic resin, wherein 70 to 100 wt. % of the content of synthetic resin in the organic film former comprises at least one water-soluble or water-dispersible synthetic resin in a content in the range of from 30 to 375 g/L selected from the group consisting of a polymer, copolymer, block polymer and graft polymer;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried and cured; and wherein the dried and optionally also cured film has a film thickness in the range from 0.01 to 10 μm, determined by detaching a defined area of the cured film and weighing it, wherein a ratio of the wax to the organic film former is from 0.02:1 to 2:, wherein the synthetic resin comprises a polymer, copolymer, block copolymer or graft copolymer based on a member selected from the group consisting of (meth)acrylate and styrene (meth)acrylate.

73. A process comprising coating a metallic surface with an aqueous composition to form a coated metal part, wherein the aqueous composition comprises:

an organic film former comprising at least one synthetic resin, wherein 70 to 100 wt. % of the content of synthetic resin blend in the organic film former comprises at least one water-soluble or water-dispersible synthetic resin in a content in the range of from 30 to 375 g/L selected from the group consisting of a polymer, copolymer, block polymer and graft polymer;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm; and water;

wherein the metallic surface is brought into contact with the aqueous composition and a substantially organic film is formed on the metallic surface, which is then dried; and wherein the dried film has a film thickness in the range from 0.01 to 10 μm, determined by detaching a defined area of the cured film and weighing it, wherein a ratio of the wax to the organic film former is from 0.02:1 to 2:1, wherein organic film former contains a synthetic resin blend, wherein the synthetic resin blend is based on a member selected from the group consisting of epoxide, (meth)acrylate, phenol, polyacrylic acid, polyether, polyethylene, polyethylenimine, polystyrene, polyvinyl and polyvinyl phenol.

74. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one inorganic crosslinker based on a member selected from the group consisting of titanium, hafnium and zirconium;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm;

f) optionally at least one organic corrosion inhibitor, at least one organic solvent or at least one additive; and g) water;

wherein the metallic surface is brought into contact with the aqueous composition and a substantially organic film is formed on the metallic surface, which is dried and cured; and wherein the dried and cured film has a film thickness in the range from 0.01 to 10 μm, determined by detaching a defined area of the dried and cured film and weighing it, wherein a ratio of wax to the organic film former is from 0.02:1 to 2:1.

75. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one crosslinker which is based on a member selected from the group consisting of titanium, hafnium, zirconium, aziridine, an azo compound, diamine, diimide, formaldehyde, imidazole, isocyanate, isocyanurate, melamine, peroxide, triazine and triazole;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm;

at least one member selected from the group consisting of an organic corrosion inhibitor, at least one organic solvent and an additive; and water;

wherein the metallic surface is brought into contact with the aqueous composition and a substantially organic film is formed on the metallic surface, which is then dried and cured;

wherein the dried and cured film has a film thickness in the range from 0.01 to 10 μm, determined by detaching a defined area of the cured film and weighing it; and wherein a ratio of the wax to the organic film former is from 0.02:1 to 2:1.

76. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one crosslinker is selected from the group consisting of a polycarbodiimine, triazine and an alkoxyalkyl melamine;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm;

f) at least one organic corrosion inhibitor, at least one organic solvent or at least one additive; and g) water;

wherein the metallic surface is brought into contact with the aqueous composition and a substantially organic film is formed on the metallic surface, which is then dried and cured; and wherein the dried and cured film has a film thickness in the range from 0.01 to 10 μm, determined by detaching a defined area of the cured film and weighing it, wherein a ratio of the wax to the organic film former is from 0.02:1 to 2:1.

77. A process comprising coating a metallic surface with an aqueous composition to form a coated metal part, wherein the aqueous composition comprises:

an organic film former comprising at least one synthetic resin, wherein 70 to 100 wt. % of the content of synthetic resin in the organic film former comprises at least one water-soluble or water-dispersible synthetic resin in a content in the range of from 30 g/L to 375 g/L selected from the group consisting of a polymer, copolymer, block polymer and graft polymer; wherein the water soluble or water-dispersible synthetic resin is based on a synthetic resin selected from the group consisting of polycarbonate, polyurethane, ionomer, poly(meth)acrylate, polyester, polyether and polystyrene, wherein the content of polycarbonate and polyurethane is at least 10 wt. % each and the content of polycarbonate and polyurethane together in the organic film former is at least 50 wt. %;

at least one 4 to 16 carbon long-chain alcohol as film-forming aid for the organic film former selected from the group consisting of a butanediol, an ethylene glycol ether and a polypropylene glycol ether;

at least one crosslinker is selected from the group consisting of a titanium compound, a zirconium compound, a hafnium compound, a polycarbodiimine, a trifunctional polyaziridine, triazine and an alkoxyalkyl melamine;

from 2 to 30 g/L of a wax, wherein the wax comprises a cationically stabilized oxidized polyethylene wax with a melting point of about 130° C., and an anionically stabilized paraffin wax with a melting point in the range from 56 to 80° C.;

A) at least one silane, silanol or siloxane or B) at least one inorganic compound in particle form with an average particle diameter measured on a scanning electron microscope in the range from 0.005 to 0.3 μm;

at least one member selected from the group consisting of an organic corrosion inhibitor and an organic solvent; and water;

wherein the metallic surface is brought into contact with the aqueous composition and a substantially organic film is formed on the metallic surface, which is then dried and cured; and wherein the dried and cured film has a film thickness in the range from 0.01 to 10 μm, determined by detaching a defined area of the cured film and weighing it; and wherein a ratio of wax to the organic film former is from 0.02:1 to 2:1.

* * * * *